(12) United States Patent
Hvelplund et al.

(10) Patent No.: US 12,412,584 B2
(45) Date of Patent: Sep. 9, 2025

(54) SYSTEM WITH POST-CONVERSATION EVALUATION, ELECTRONIC DEVICE, AND RELATED METHODS

(71) Applicant: GN Audio A/S, Ballerup (DK)

(72) Inventors: Anders Hvelplund, Ballerup (DK); Christian Lillelund, Ballerup (DK); Ali Özkil, Ballerup (DK)

(*) Notice: Subject to any disclaimer, the term of this patent is extended or adjusted under 35 U.S.C. 154(b) by 321 days.

(21) Appl. No.: 17/726,602

(22) Filed: Apr. 22, 2022

(65) Prior Publication Data
US 2022/0358935 A1 Nov. 10, 2022

(30) Foreign Application Priority Data
May 4, 2021 (DK) .......................... PA 2021 70206

(51) Int. Cl.
| | | |
|---|---|---|
| G10L 17/22 | (2013.01) | |
| G06Q 10/0639 | (2023.01) | |
| G10L 25/51 | (2013.01) | |
| H04M 3/51 | (2006.01) | |
| G10L 17/02 | (2013.01) | |
| G10L 25/63 | (2013.01) | |
| G10L 25/72 | (2013.01) | |

(52) U.S. Cl.
CPC ........ G10L 17/22 (2013.01); G06Q 10/06398 (2013.01); G10L 25/51 (2013.01); H04M 3/5175 (2013.01); G10L 17/02 (2013.01); G10L 25/63 (2013.01); G10L 25/72 (2013.01)

(58) Field of Classification Search
CPC ......... G10L 17/22; G10L 25/51; G10L 17/02; G10L 25/63; G10L 25/72; G06Q 10/06398; H04M 3/5175

USPC .......................................................... 704/246
See application file for complete search history.

(56) References Cited

U.S. PATENT DOCUMENTS

| | | | |
|---|---|---|---|
| 9,596,349 B1 * | 3/2017 | Hernandez | .............. G10L 17/08 |
| 10,395,648 B1 * | 8/2019 | Benkreira | ........... G06F 18/2178 |
| 2011/0196677 A1 | 8/2011 | Deshmuks et al. | |

(Continued)

FOREIGN PATENT DOCUMENTS

| | | |
|---|---|---|
| CN | 107967611 A | 4/2018 |
| EP | 3711283 | 9/2020 |

(Continued)

*Primary Examiner* — Edwin S Leland, III

(57) ABSTRACT

System, electronic device, and related methods, in particular a method of operating a system comprising an electronic device is disclosed, the method comprising obtaining one or more audio signals including a first audio signal of a first conversation; determining a first conversation period of the first conversation, the first conversation period having a first duration; determining first conversation metric data including a first conversation metric based on the first conversation period; determining a second conversation period of the first conversation different from the first conversation period, the second conversation period having a second duration; determining second conversation metric data including a second conversation metric based on the second conversation period; determining a first performance metric based on a change between the first conversation metric data and the second conversation metric data; outputting, via the interface of the electronic device, the first performance metric.

18 Claims, 6 Drawing Sheets

(56) References Cited

U.S. PATENT DOCUMENTS

| | | | | |
|---|---|---|---|---|
| 2012/0189129 A1* | 7/2012 | Gabara | ............ | H04M 1/72454 |
| | | | | 381/56 |
| 2012/0191454 A1* | 7/2012 | Gabara | ................ | G06F 16/953 |
| | | | | 704/E17.001 |
| 2014/0163960 A1* | 6/2014 | Dimitriadis | ............. | G10L 25/63 |
| | | | | 704/9 |
| 2015/0195406 A1* | 7/2015 | Dwyer | .................... | G10L 15/02 |
| | | | | 379/265.07 |
| 2018/0124242 A1 | 5/2018 | Zimmerman | | |
| 2019/0253558 A1 | 8/2019 | Haukioja et al. | | |
| 2019/0325897 A1* | 10/2019 | Liu | .................... | H04M 3/5175 |
| 2020/0004816 A1* | 1/2020 | Kieser | .................... | G06F 40/30 |
| 2021/0076002 A1* | 3/2021 | Peters | .................... | H04N 7/152 |
| 2022/0358935 A1* | 11/2022 | Hvelplund | ........ | G06Q 10/06398 |

FOREIGN PATENT DOCUMENTS

| | | | | |
|---|---|---|---|---|
| EP | 4086903 A1 * | 11/2022 | ....... | G06Q 10/06398 |
| WO | 2019099938 | 5/2019 | | |

\* cited by examiner

SYSTEM WITH POST-CONVERSATION EVALUATION, ELECTRONIC DEVICE, AND RELATED METHODS

The present disclosure relates to speech processing and related tools and methods, and systems in particular for analysing, monitoring and/or evaluating speech of one or more speakers, for example a caller and/or an agent of a call and/or one or more participants of a telephone conversation or a meeting, such as an online meeting. Thus, a system, an electronic device, and related methods, in particular a method of operating a system comprising an electronic device is provided.

BACKGROUND

Today the interaction between people is increasingly taking place at a distance and virtually, e.g. via telephone calls, conference calls, and the like. However, it may be difficult for people speaking to each other on each side of a telephone call, to grasp emotions or sentiments of the other party by just listening to a speech.

For example, almost all support and after sales is performed over the phone between call center agents initiating and/or answering the calls and potential customers being contacted or customers contacting call center agents with various issues. Call center agents working at call centers, support center, or contact centers struggle with a job that can at time be monotonous and repetitive. This represents a negative experience for the agents, but it also leads to a worse tone performance, and in turn a lower customer satisfaction for the customers on the other end of the line and on average, longer calls. After taking calls for many hours, it can be difficult to remember that there is a human being on the other side of the call, who are longing for help to solve a problem.

SUMMARY

Accordingly, there is a need for systems, electronic devices, and methods of operating systems with improved evaluation and/or feedback on a conversation.

A method of operating a system comprising an electronic device and/or a server device, the electronic device comprising an interface, a processor, and a memory, is disclosed. The method comprises obtaining one or more audio signals including a first audio signal of a first conversation. The method comprises determining a first conversation period of the first conversation, the first conversation period having a first duration. The method comprises determining first conversation metric data including a first conversation metric based on the first conversation period. The method comprises determining a second conversation period of the first conversation different from the first conversation period, the second conversation period having a second duration. The method comprises determining second conversation metric data including a second conversation metric based on the second conversation period. The method comprises determining a first performance metric based on a change between the first conversation metric data and the second conversation metric data. The method comprises outputting, e.g. from the server device to the electronic device and/or via the interface of the electronic device, the first performance metric.

Further, an electronic device is disclosed, the electronic device comprising a processor, a memory, and an interface, wherein the processor is configured to perform the steps of a method according to this disclosure.

Also disclosed is an electronic device comprising a processor, a memory, and an interface, wherein the processor is configured to obtain one or more audio signals optionally including a first audio signal during a first conversation. Optionally the processor is configured to determine first speaker metric data of a first speaker based on the first audio signal, the first speaker metric data including first primary speaker metric data. Optionally, the processor is configured to determine a first conversation period of the first conversation, the first conversation period having a first duration.

Optionally, the processor is configured to determine first conversation metric data including a first conversation metric based on the first conversation period.

Optionally, the processor is configured to determine a second conversation period of the first conversation, the second conversation period having a second duration.

Optionally, the processor is configured to determine second conversation metric data including a second conversation metric based on the second conversation period.

Optionally, the processor is configured to determine first performance metric based on a change between the first conversation metric data and the second conversation metric data.

Optionally, the processor is configured to output, e.g. from the server device to the electronic device and/or via the interface, the first performance metric and/or a first post-conversation representation based on the first performance metric. To output, the first performance metric may comprise receiving the first performance metric and/or the first post-conversation representation, from a server device, and outputting, e.g. displaying, the first performance metric and/or the first post-conversation representation.

Also disclosed is a system comprising a server device and an electronic device, wherein the electronic device is an electronic device according to the disclosure.

Also disclosed is a server device comprising an interface, one or more processors, and a memory, the one or more processors may be configured to perform at least parts of any the methods disclosed herein. For example, determining speaker metric data, detect a termination of a conversation, and/or determine a post-conversation representation may be performed at the server device. For example, determining first conversation period(s), second conversation period(s), first conversation metric(s), first conversation metric(s), first performance metric(s), and/or first post-conversation representation(s) may be performed at the server device. The first conversation period(s), second conversation period(s), first conversation metric(s), first conversation metric(s), first performance metric(s), and/or first post-conversation representation(s) may be transmitted to the electronic device for output, such as display, via the electronic device.

It is an advantage of the present disclosure that by providing a performance metric, e.g. after a conversation, a user may see or be informed right after a conversation, such as call, or between conversations/calls, about his/her performance and/or the outcome of the conversation in relation to one or more metrics, such as conversation metrics, e.g. speaker metrics such as a sentiment and/or a tone. The user/speaker of the electronic device may thereby receive a post-conversation evaluation after a conversation with a second speaker. Furthermore, the user may get a better evaluation and/or feedback on his/her performance or on the outcome of the conversation. The user may get evaluation and/or feedback after a conversation e.g. after a working day, between conversations (e.g. between every conversations or between a series of conversations), before a conversation, e.g. before starting a working day. The user may be a manager reviewing and/rating one or more conversations and/or training sessions of one or more other users. The performance metric, such as first performance metric, may provide a post-conversation evaluation of the user. The performance metric and/or the post-conversation representation may provide a gamification of the users' performances, such as a gamification of the users' evaluation. The performance metric may for example increase the engagement of a user in his/her work, e.g. by being able to visualize an improvement of performances. This may be to visualize an improvement of the user's own performances and/or in view of other user's performances, e.g. users in the same company or team. The performance metric may for example increase the motivation of the user and give an incentive or a motivational factor to perform better. The user may improve his/her speaking capabilities, e.g. improving consistency during the day by keeping a positive/great tone with a negative speaker, avoid poor speech performance, such as interruptions, long pauses, monotony, and/or speaking rate.

It is an advantage of the present disclosure that a speaker/user is able to monitor/evaluate a conversation, a customer, and/or a meeting, in turn allowing the speaker/user to accommodate or adapt the speaker's speech, such as tone of the speech, to improve his/her performance during a conversation and/or for future conversations. Further, the user may get an overview of a conversation development of the conversations performed. This may improve an outcome of a presentation by the speaker and/or an outcome of a conversation or meeting between the speaker and one or more other speakers. The present disclosure may also provide a development path or area for the users to improve their skills and/or competences in time, e.g. helping users to reach and/or improve their key performance indicators, KPIs. The speaker may further have an improved understanding of a conversation and/or of the other speaker, e.g. a better grasp of emotions of the other speaker. The speaker/user may for example be able to see when a customer/caller have flipped/turned in the last conversation/call or streak of conversations/calls, e.g. changed from a negative speaker state to a positive speaker state.

Further, the present disclosure provides an improved call or conversation evaluation, feedback and/or monitoring by displaying one or more speaker representations with increased detail level.

Further, the present disclosure provides improved speaker representations, in turn allowing improved representations and more specific feedback and/or personalization of the speaker representation. By providing improved post-conversation evaluation, the speaker/user may have an increased engagement in a conversation or a meeting, e.g. an increased engagement with regard to his/her job and/or in view of the other speaker. An advantage of having a performance metric, e.g. after a conversation may be that the user of the electronic device may see or be informed right after a conversation, such as call, about his/her performance or the outcome of the conversation in relation e.g. to the sentiment and/or the tone of the other speaker. Furthermore, the user of the electronic device may get a better feedback on his/her performance or on the outcome of the conversation. The performance metric may provide a gamification of the users' performances. The performance metric may for example increase the engagement of a user in his/her work, e.g. by being able to visualize an improvement of performances.

BRIEF DESCRIPTION OF THE DRAWINGS

The above and other features and advantages of the present invention will become readily apparent to those skilled in the art by the following detailed description of exemplary embodiments thereof with reference to the attached drawings, in which.

DETAILED DESCRIPTION

Figure 1:
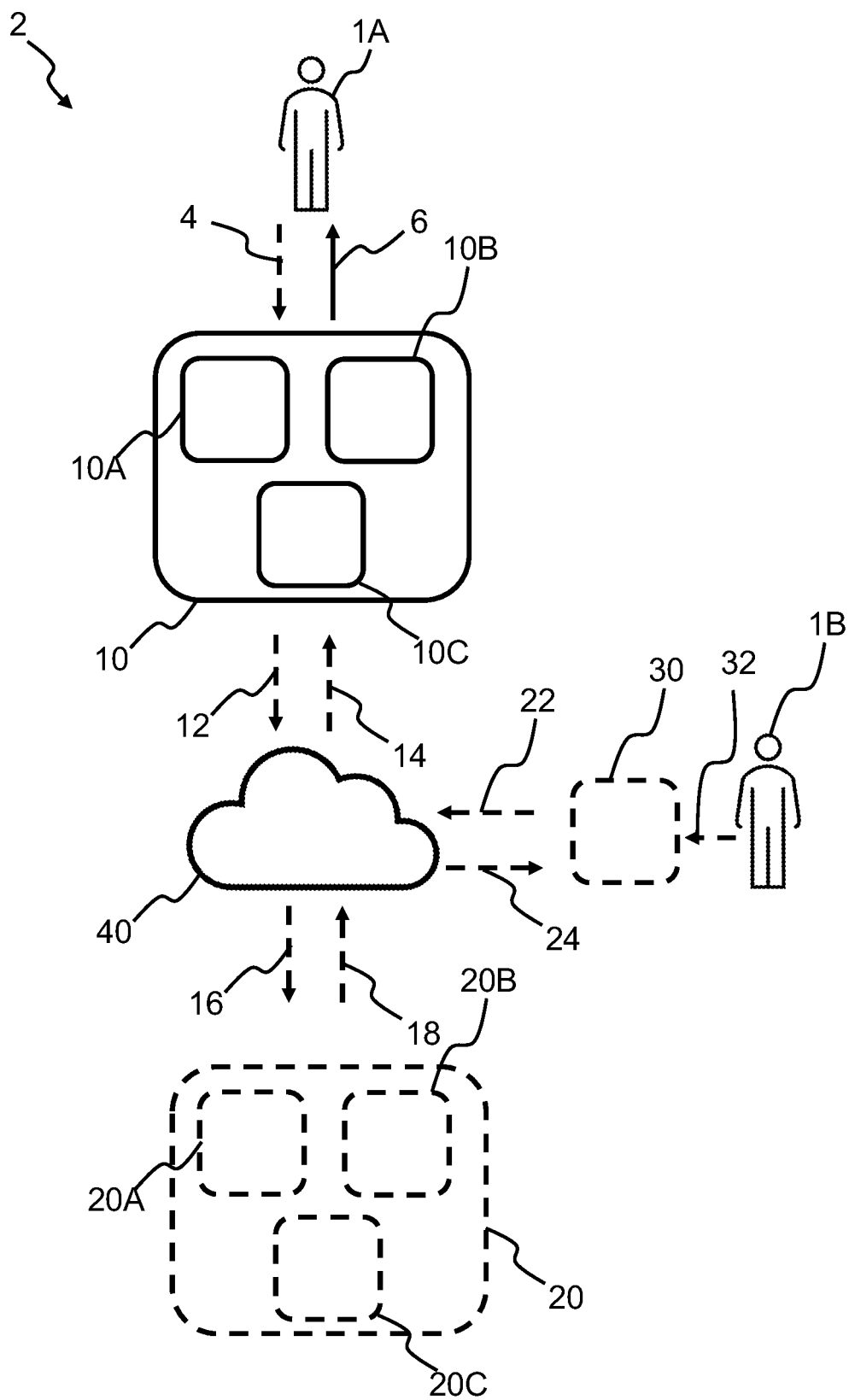
FIG. 1 schematically illustrates an exemplary system comprising a server device and an electronic device according to the present disclosure.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

A method of operating a system comprising an electronic device is disclosed. The system may optionally comprise a server device comprising an interface, one or more processors, and a memory. The server device may be configured on a cloud, such as a cloud network. The system may be a system for monitoring, handling, and/or analysing one or more audio signals, e.g. including audio signal(s) of one or more speakers talking, e.g. as a monologue or a conversation, such as a meeting conversation, a video/telephone conference conversation, or a call, e.g. a telephone or VoIP call. The system may be a system for evaluating, monitoring, handling, and/or analysing one or more audio signals, such as a conversation, e.g. between two or more people/speakers, such as a conversation in a phone call or a meeting. The system may for example comprise or act as a call center system for monitoring, handling, and/or analysing one or more audio signals, such as conversations between two or more people, e.g. a phone call between an agent of the call center system and a customer or caller. The system may be configured to use edge processing between one or more electronic devices. The system may be configured to use edge processing between one or more electronic devices. Different operations and/or steps of the method and/or the system may be performed at different devices, such as at the electronic device and/or at the server device.

The electronic device comprises an interface, a processor, and a memory. The electronic device may for example be or comprise a mobile phone, such as a smartphone, a computer, such as a laptop computer or PC, or a tablet computer. The electronic device may for example be a user device, such as a mobile phone or a computer, configured to perform a call between a user and one or more persons. The electronic device may be configured to obtain first audio input, such as first audio input from the call between the user and another person. For example, the electronic device may act as call agent device where the user may be an agent, such as an agent of a call center, such as a support call center, an after sales call center, a marketing call center, a reception call center, a sales call center, or companies where an important part of the employees' job is to have conversations with customers. The electronic device may for example be a user device, such as a mobile phone or a computer, configured to record first audio input from a first speaker, such as record the first speaker speaking or talking. The electronic device may be configured to obtain one or more audio signals, such as generate one or more audio signals, including a first audio signal. The first audio signal may be based on the first audio input.

The method comprises obtaining one or more audio signals, also denoted $AS\_i$, i=1, 2, ... N, where N is the number of speakers/audio signals, the one or more audio signals including a first audio signal, also denoted $AS\_1$, of a first conversation, also denoted $C\_1$. The first conversation may be a first voice communication. The first audio signal may be representative of first speech/voice of a first speaker of the first conversation. The first speaker may be a caller, an agent, or a first participant in a telephone conversation or a meeting, e.g. comprising the first conversation, such as where the first conversation takes place. The one or more audio signals optionally includes a second audio signal, also denoted $AS\_2$. The second audio signal may be representative of second speech/voice of a second speaker of the first conversation. The second speaker may be a caller, an agent, an interviewer, or a second participant in a telephone conversation or a meeting, e.g. comprising the first conversation, such as where the first conversation takes place.

Obtaining one or more audio signals may comprise obtaining one or more audio inputs, such as a first audio input. In other words, the first audio signal may be based on the first audio input. The first audio signal may be obtained from a call or conversation between the user and another person, e.g. a first call or the first conversation. The first speaker may be the person speaking/talking the most during the first call and/or the first conversation. The first speaker may be the first person speaking during the first call and/or first conversation. The first speaker may be a person of interest that the user may want an evaluation of (such as performance on), such as the first performance metric. The first audio signal may be obtained from the electronic device recording first audio input from a first speaker, such as recording the first speaker speaking or talking. Obtaining one or more audio signals may comprise generating one or more audio signals, including the first audio signal. The first audio signal may be based on the first audio input. The first audio signal may comprise a first speaker audio signal. The first audio signal may be an agent audio signal or a caller audio signal, and a second audio signal is the other.

The method comprises determining a first conversation period, also denoted $CP\_1$, of the first conversation. The first conversation period $CP\_1$ may correspond to or be indicative of an initiation phase (such as an initial phase or an introductory part) of the first conversation $C\_1$, e.g. a first speaker and/or a second speaker presenting themselves to each other, stating their issue(s)/problem(s), and/or starting a discussion on a topic. The first conversation period may comprise one or more speech segments of a first speaker and/or a second speaker. The first conversation period may have a first duration. The first duration may be determined based on a content of the first conversation, e.g. the content of the one or more speech segments of the first speaker and/or the second speaker. For example, a specific speech segment and/or a specific word may indicate the end of the first conversation period. The first duration may be determined based on a number of speaker changes, e.g. based on a number of changes between the first speaker speaking and the second speaker speaking. The first duration of the first conversation period may therefore vary based on the content of the first conversation period. The first conversation period may have a first duration in the range of 2 s to 5 min, such as 10 s to 2 min. In one or more exemplary methods, the first duration may be a fixed duration, e.g. a predetermined duration. For example, it may be determined that the average first duration is 30 s, 1 min, or 2 min. The first conversation period may for example comprise the first 30 s of the conversation. The second conversation period may for example comprise the last 30 s of the conversation. A conversation period may be understood as a turn where a person, such as a speaker, speaks. In other words, one or more persons, such as one or more speakers, having a conversation may take turns at speaking to each other. For example, a conversation period may also be denoted a turn where a person speaks, such as the first conversation period may be denoted a first turn of a first speaker or of a second speaker and/or the second conversation period may be denoted a second turn of a first speaker or of a second speaker. Alternatively and/or additionally, a conversation period may comprise one or more turns of one or more speakers. For example, the first conversation period may comprise a first turn of a first speaker, a first turn of a second speaker, a second turn of a first speaker, and/or a second turn of a second speaker. The end of a turn and the beginning of another turn may be determined by a speaker stopping to speak and another speaker starting speaking and/or a speaker interrupting a speaker while he is speaking. A conversation may be split up or divided in one or more conversation periods. In other words, a conversation may be split up or divided in one or more parts.

In one or more exemplary methods, the method may comprise to determine whether a conversation satisfies a duration criterion. In one or more exemplary methods, the method may comprise to discard a conversation, when the conversation does not satisfy the duration criterion. In one or more exemplary methods, the method may comprise to keep a conversation, when the conversation satisfies the duration criterion. The duration criterion may comprise a duration threshold, e.g. a minimum duration that a conversation shall have for being considered/analysed.

The first conversation period $CP\_1$ may have a first start time (such as a first start timestamp) and a first end time (such as a first end timestamp). The time between the start time and the end time may correspond to the first duration. The first duration may also be denoted first time period.

The method comprises determining first conversation metric data, also denoted $CMD\_1$, including a first conversation metric, also denoted $CM\_1$, based on the first conversation period $CP\_1$. Determining first conversation metric data $CMD\_1$ may comprise determining the first conversation metric $CM\_1$. Determining first conversation metric data $CMD\_1$ may comprise determining speaker metric data, also denoted SPMD.

In one or more exemplary methods, determining first conversation metric data $CMD\_1$ comprises determining first speaker metric data $SPMD\_1$ of a first speaker in the first conversation, e.g. during the first conversation period $CP\_1$, and/or second speaker metric data $SPMD\_2$ of a second speaker in the first conversation, e.g. during the first conversation period $CP\_1$.

The method comprises determining a second conversation period, also denoted CP_2, of the first conversation. The second conversation period CP_2 may occur after the first conversation period. The second conversation period CP_2 may correspond to or be indicative of an ending phase (such as a concluding part) of the first conversation C_1, e.g. a first speaker and/or a second speaker concluding the first conversation, saying goodbye, and/or ending a discussion on a topic. For example, the first speaker being an agent may ask the second speaker being a customer if all his/her questions have been answered. The second conversation period may comprise one or more speech segments of a first speaker and/or a second speaker. The second conversation period may have a second duration. The second duration may be different or equal to the first duration. The second duration may be determined based on a content of the first conversation, e.g. the content of the one or more speech segments of the first speaker and/or the second speaker. The second duration may be determined based on the first conversation period. For example, a specific speech segment and/or a specific word may indicate the end of the second conversation period. The second duration may be determined based on a number of speaker changes, e.g. based on a number of changes between the first speaker speaking and the second speaker speaking. The second duration of the second conversation period may therefore vary based on the content of the second conversation period. The second conversation period may have a second duration in the range of 2 s to 5 min, such as 10 s to 2 min. In one or more exemplary methods, the second duration may be a fixed duration, e.g. a predetermined duration. For example, it may be determined that the average second duration is 30 s, 1 min, or 2 min.

The second conversation period CP_2 may have a second start time (such as a second start timestamp) and a second end time (such as a second end timestamp). The time between the start time and the end time may correspond to the second duration. The second conversation period CP_2 may be determined based on a detection of a termination of the first conversation. The second duration may also be denoted second time period.

In one or more exemplary methods, the first conversation period is associated with a first phase of the first conversation and the second conversation period is associated with a second phase of the first conversation. The first phase may be an initiation phase of the first conversation, such as a start of the first conversation. The second phase may be a closing phase of the first conversation, such as an ending of the first conversation.

In one or more exemplary methods, the method comprises determining a third conversation period, also denoted CP_3, of the first conversation. The third conversation period CP_3 may occur after the first conversation period and/or before the second conversation period. The third conversation period CP_3 may correspond to or be indicative of an intermediate phase (such as a middle part) of the first conversation C_1, e.g. a first speaker and/or a second speaker discussing and/or arguing in the first conversation, explaining, helping, and/or asking questions to each other and answering the questions. For example, the first speaker being an agent may respond to the questions and/or inquiries of the second speaker being a customer. The third conversation period may comprise one or more speech segments of a first speaker and/or a second speaker. The third conversation period may have a third duration. The third duration may be different or equal to the first duration and/or the second duration. The third duration may be determined based on a content of the first conversation, e.g. the content of the one or more speech segments of the first speaker and/or the second speaker after the first conversation period. The third duration may be determined based on the first conversation period. The second duration may be determined based on the first conversation period and/or the third conversation period. For example, a specific speech segment and/or a specific word may indicate the end of the first conversation period and the start of the third conversation period. For example, a specific speech segment and/or a specific word may indicate the end of the third conversation period and the start of the second conversation period. The third duration may be determined based on a number of speaker changes, e.g. based on a number of changes between the first speaker speaking and the third speaker speaking. The third duration of the third conversation period may therefore vary based on the content of the third conversation period. The third conversation period may have a third duration in the range of 2 s to 15 min, such as 10 s to 10 min. In one or more exemplary methods, the third duration may be a fixed duration, e.g. a predetermined duration. For example, it may be determined that the average third duration is 30 s, 1 min, 2 min, 5 min, or 10 min.

The third conversation period CP_3 may have a third start time (such as a third start timestamp) and a third end time (such as a third end timestamp). The time between the start time and the end time may correspond to the third duration. The third conversation period CP_3 may be determined based on a detection of a termination of the first conversation period and a start of the second conversation period. The third duration may also be denoted third time period. The third conversation period may occur between the first conversation period and the second conversation period.

The description of the first conversation period and the second conversation period may also apply to the third conversation period. For example, the description of the first conversation metric data and the second conversation metric data may apply to the description of the third conversation metric data, e.g. relating to the speaker metric data, sentiment metric data, tone metric data, and/or speaker representation.

In one or more exemplary methods, the time period between the first conversation period CP_1 and the second conversation period CP_1 is at least 15 s. In other words, the time period between the end of the first conversation period CP_1, e.g. the first end time, and the start of the second conversation period CP_2, e.g. the second start time, is at least 15 s. The time period may be at least 30 s, at least 1 min, at least 2 min, at least 5 min, at least 10 min, or at least 20 min.

The method comprises determining second conversation metric data, also denoted CMD_2, including a second conversation metric, also denoted CM_2, based on the second conversation period CP_2. Determining second conversation metric data CMD_2 may comprise determining the second conversation metric CM_2. Determining second conversation metric data CMD_2 may comprise determining speaker metric data, also denoted SPMD.

In one or more exemplary methods, determining second conversation metric data CMD_2 comprises determining first speaker metric data SPMD_1 of a first speaker in the first conversation, e.g. during the second conversation period CP_2, and/or second speaker metric data SPMD_2 of a second speaker in the first conversation, e.g. during the second conversation period CP_2.

Determining speaker metric data SPMD may comprise determining first speaker metric data, also denoted SPMD_1, of a first speaker based on the first audio signal of the first conversation, e.g. during the first conversation period CP_1 and/or the second conversation period CP_2. In other words, the speaker metric data SPMD may comprise first speaker metric data SPMD_1 indicative of the first speaker and/or second speaker metric data SPMD_2 indicative of a second speaker in the first conversation C_1, e.g. in the first conversation period CP_1 and/or the second conversation period CP_2. The speaker metric data SPMD may comprise one or more speaker metrics over time, e.g. one or more first speaker metrics over time (SPMD_1) and/or one or more second speaker metrics over time (SPMD_2). In other words, determining speaker metric data SPMD may comprise determining one or more speaker metrics SM over time, e.g. over a conversation. In other words, determining first conversation metric data, such as the first conversation metric, may comprise determining one or more speaker metrics SM over the first conversation period. In other words, determining second conversation metric data, such as the second conversation metric, may comprise determining one or more speaker metrics SM, over the second conversation period. Determining first speaker metric data SPMD_1 may comprise determining one or more first speaker metrics SPM_1 over time, e.g. over the first conversation period and/or the second conversation period.

Determining first speaker metric data SPMD_1 may comprise determining first primary speaker metric data, also denoted SPMD_1_1 of a first speaker in the first conversation period. Determining first primary speaker metric data SPMD_1_1 may comprise determining one or more first primary speaker metrics SPM_1_1 of the first speaker over time, e.g. over the first conversation period. In other words, the first speaker metric data SPMD_1 may comprise first primary speaker metric data SPMD_1_1. Further, the first speaker metric data may comprise or be indicative of one or more of the first primary speaker metric data SPMD_1_1 comprising one or more first primary speaker metrics.

Determining first speaker metric data SPMD_1 may comprise determining first secondary speaker metric data, also denoted SPMD_1_2, of a first speaker in the second conversation period. Determining first secondary speaker metric data SPMD_1_2 may comprise determining one or more first secondary speaker metrics SPM_1_2 of the first speaker over time, e.g. over the second conversation period. In other words, the first speaker metric data SPMD_1 may comprise first secondary speaker metric data SPMD_1_2. Further, the first speaker metric data may comprise or be indicative of one or more of the first secondary speaker metric data SPMD_1_2 comprising one or more first secondary speaker metrics of the first speaker.

Determining second speaker metric data SPMD_2 may comprise determining second primary speaker metric data, also denoted SPMD_2_1 of a second speaker in the first conversation period. Determining second primary speaker metric data SPMD_2_1 may comprise determining one or more second primary speaker metrics SPM_2_1 of the second speaker over time, e.g. over the first conversation period. In other words, the second speaker metric data SPMD_2 may comprise second primary speaker metric data SPMD_2_1. Further, the second speaker metric data may comprise or be indicative of one or more of the second primary speaker metric data SPMD_2_1 comprising one or more second primary speaker metrics.

Determining second speaker metric data SPMD_2 may comprise determining second secondary speaker metric data, also denoted SPMD_2_2, of a second speaker in the second conversation period. Determining second secondary speaker metric data SPMD_2_2 may comprise determining one or more second secondary speaker metrics SPM_2_2 of the second speaker over time, e.g. over the second conversation period. In other words, the second speaker metric data SPMD_2 may comprise second secondary speaker metric data SPMD_2_2. Further, the second speaker metric data may comprise or be indicative of one or more of the second secondary speaker metric data SPMD_2_2 comprising one or more second secondary speaker metrics of the second speaker.

In one or more exemplary methods, the first conversation metric data CMD_1 and the second conversation metric data CMD_2 each comprises sentiment metric data, also denoted SMD, and/or tone metric data, also denoted TMD.

In one or more exemplary methods, the first primary speaker metric data SPMD_1_1 is sentiment metric data SMD, such as sentiment metric data of the first speaker in the first conversation period. Determining first primary speaker metric data SPMD_1_1 may comprise determining sentiment metric data SMD. In one or more exemplary methods, determining first primary speaker metric data SPMD_1_1 may comprise determining one or more first sentiment metrics, also denoted SM_1_$i$, $i$=1, 2, . . . , M, where M is the number of first sentiment metrics. In other words, the sentiment metric data SMD may comprise one or more first sentiment metrics over time, e.g. over and/or during the first conversation period.

In one or more exemplary methods, the second primary speaker metric data SPMD_2_1 is sentiment metric data SMD of the second speaker in the first conversation period. Determining second primary speaker metric data SPMD_2_1 may comprise determining sentiment metric data SMD of the second speaker in the first conversation period. In one or more exemplary methods, determining second primary speaker metric data SPMD_2_1 may comprise determining one or more second sentiment metrics, also denoted SM_2_$i$, $i$=1, 2, . . . , M, where M is the number of second sentiment metrics. In other words, the sentiment metric data SMD may comprise one or more second sentiment metrics over time, e.g. over and/or during the first conversation period.

In one or more exemplary methods, the first primary speaker metric data SPMD_1_1 is tone metric data TMD, such as tone metric data of the first speaker in the first conversation period. Determining first primary speaker metric data SPMD_1_1 may comprise determining tone metric data TMD. In one or more exemplary methods, determining first primary speaker metric data SPMD_1_1 may comprise determining one or more first tone metrics, also denoted TM_1_$i$, $i$=1, 2, . . . , m, where m is the number of first tone metrics. In other words, the tone metric data TMD may comprise one or more first tone metrics over time, e.g. over and/or during the first conversation period.

In one or more exemplary methods, the second primary speaker metric data SPMD_2_1 is tone metric data TMD of the second speaker in the first conversation period. Determining second primary speaker metric data SPMD_2_1 may comprise determining tone metric data SMD of the second speaker in the first conversation period. In one or more exemplary methods, determining second primary speaker metric data SPMD_2_1 may comprise determining one or more second tone metrics, also denoted TM_2_$i$, $i$=1, 2, . . . , m, where m is the number of second tone metrics. In other words, the tone metric data TMD may comprise one or more second tone metrics over time, e.g. over and/or during the first conversation period.

In one or more exemplary methods, the first secondary speaker metric data SPMD_1_2 is sentiment metric data SMD, such as sentiment metric data of the first speaker in the second conversation period. Determining first secondary speaker metric data SPMD_1_2 may comprise determining sentiment metric data SMD. In one or more exemplary methods, determining first secondary speaker metric data SPMD_1_2 may comprise determining one or more first sentiment metrics, also denoted SM_1_$i$, i1=1, 2, . . . , M, where M is the number of first sentiment metrics. In other words, the sentiment metric data SMD may comprise one or more first sentiment metrics over time, e.g. over and/or during the second conversation period.

In one or more exemplary methods, the second secondary speaker metric data SPMD_2_2 is sentiment metric data SMD of the second speaker in the second conversation period. Determining second secondary speaker metric data SPMD_2_2 may comprise determining sentiment metric data SMD of the second speaker in the second conversation period. In one or more exemplary methods, determining second secondary speaker metric data SPMD_2_2 may comprise determining one or more second sentiment metrics, also denoted SM_2_$i$, i=1, 2, . . . , M, where M is the number of second sentiment metrics. In other words, the sentiment metric data SMD may comprise one or more second sentiment metrics over time, e.g. over and/or during the second conversation period.

In one or more exemplary methods, the first secondary speaker metric data SPMD_1_2 is tone metric data TMD, such as tone metric data of the first speaker in the second conversation period. Determining first secondary speaker metric data SPMD_1_2 may comprise determining tone metric data SMD. In one or more exemplary methods, determining first secondary speaker metric data SPMD_1_2 may comprise determining one or more first tone metrics, also denoted TM_1_$i$, i=1, 2, . . . , m, where m is the number of first tone metrics. In other words, the tone metric data SMD may comprise one or more first tone metrics over time, e.g. over and/or during the second conversation period.

In one or more exemplary methods, the second secondary speaker metric data SPMD_2_2 is tone metric data SMD of the second speaker in the second conversation period. Determining second secondary speaker metric data SPMD_2_2 may comprise determining tone metric data SMD of the second speaker in the second conversation period. In one or more exemplary methods, determining second secondary speaker metric data SPMD_2_2 may comprise determining one or more second tone metrics, also denoted TM_2_$i$, i=1, 2, . . . , m, where m is the number of second tone metrics. In other words, the tone metric data SMD may comprise one or more second tone metrics over time, e.g. over and/or during the second conversation period.

A sentiment metric is indicative of a sentiment state of a speaker. The first speaker metric data and/or the second speaker metric data may comprise one or more first sentiment parameters, e.g. comprised in the sentiment metric data SMD. The one or more first sentiment parameters may be based on the one or more first sentiment metrics. For example, the sentiment metric data SMD may be indicative of, or comprise a first sentiment parameter being a mean sentiment of a speaker over a conversation period, (such as the first conversation period and/or the second conversation period) and/or a sentiment outcome of a conversation period (e.g. the overall sentiment state of the speaker when the conversation period is terminated). A sentiment metric may comprise one or more of a sentiment type identifier, sentiment level(s), and a confidence score.

A tone metric may be indicative of a tone of a speaker. The first conversation metric data and/or the second conversation metric data, e.g. the first speaker metric data, may comprise one or more first tone parameters, e.g. comprised in the tone metric data TMD. The one or more first tone parameters may be based on the one or more first tone metrics. For example, the tone metric data TMD may be indicative of, or comprise a first tone parameter being a mean tone of a speaker over a conversation or a conversation period and/or a tone outcome of a conversation (e.g. the overall tone of the speaker when the conversation is terminated, e.g. when comparing the first conversation period, the second conversation period, and/or the third conversation period). Tone metric data TMD may be indicative of a mean tone of a speaker over a conversation period, e.g. over the first conversation period, the second conversation period, and/or the third conversation period. Tone metric data TMD may comprise one or more speech metrics. In other words, the tone metric data may comprise one or more speech metrics e.g. interruptions, overtalks, long pauses, high or low speech rate, high or low intonation, turn or flip of a speaker (e.g. turning a customer from negative to positive or vice-versa), and/or responsiveness. The tone metric data may comprise count of events, e.g. count of one or more metrics.

The one or more first sentiment metrics, such as SM_1_1 and/or SM_1_2, are indicative of a first speaker state, i.e. one or more first sentiment states of the first speaker, and may be based on the first audio signal and/or the second audio signal. The one or more first sentiment metrics SM_1_$i$ may comprise one or more parameters indicative of the first speaker state. The first primary sentiment metric SM_1_1 may be indicative of a first speaker state in the first conversation period and/or the second conversation period. The first secondary sentiment metric SM_1_2 may be indicative of a first speaker state in the first conversation period and/or the second conversation period. The first speaker state of the first speaker may change from the first conversation period to the second conversation period.

The one or more first sentiment metrics SM_1_$i$ may include a first primary sentiment metric, also denoted SM_1_1, indicative of a primary sentiment state of a first speaker. In other words, SM_1_1 may be indicative of a primary emotion of the first speaker. SM_1_1 may be indicative of a dominating sentiment state and/or a first sentiment state in time of the first speaker, e.g. during the first conversation period and/or the second conversation period. The primary sentiment state may be one of disappointed, bored, afraid, sad, negative, very negative, frustrated, annoyed, fearful, panicking, hesitant, dissatisfied, angry, surprised, worried, wondering, not understanding, thinking, neutral, positive, very positive, glad, friendly, confident, excited, pleased, satisfied, aroused, content, relaxed, energetic, enthusiastic, service-minded, friendly, polite, helpful, interested, and happy. In one or more exemplary methods/systems, the primary sentiment state of the first speaker may be selected from a primary set of sentiment states. Each of the first conversation metric data and the second conversation metric data may comprise one or more first sentiment metrics, such as a first primary sentiment metric SM_1_1 and a first secondary sentiment metric SM_1_2.

A first sentiment metric SM_1_$i$ may comprise a first sentiment type identifier, also denoted ST_ID_1_$i$, where i is an index, and i=1, 2, . . . H, where H is the number of first sentiment type identifiers. In other words, determining one or more first sentiment metrics SM_1_$i$ may comprise determining a first sentiment type identifier ST_ID_1_$i$, e.g. a first primary sentiment type identifier ST_ID_1_1 of the first primary sentiment metric SM_1_1. A sentiment type identifier is indicative of a sentiment state of a speaker.

A sentiment type identifier may for example be a label, a number or value, such as an integer, corresponding to a specific sentiment (state), a sentiment type and/or a sentiment class. For example, ST_ID_1_$i$ may respectively be selected from the same or different sets of sentiment type identifiers. For example, ST_ID_1_1 may be selected from a primary set of sentiment type identifiers and/or ST_ID_1_2 may be selected from a secondary set of sentiment type identifiers. The primary set of sentiment type identifiers may be different from or the same as the secondary set of sentiment type identifiers. The primary set of sentiment type identifiers and the secondary set of sentiment type identifiers may share one or more, such as a plurality of, sentiment type identifiers.

In one or more exemplary methods, the first primary sentiment metric SM_1_1 comprises a first primary sentiment type identifier ST_ID_1_1 selected from a primary set of sentiment type identifiers ST_ID_SET_1, where ST_ID_SET_1 comprises a plurality of sentiment type identifiers, e.g. including at least three, four, five or more sentiment type identifiers.

In one or more exemplary methods, the primary set of sentiment type identifiers ST_ID_SET_1 is given by:

ST_ID_SET_1={1,2,3,4,5}, where "1" is indicative of a sentiment, such as "Very negative", "2" is indicative of a sentiment, such as "Negative", "3" is indicative of a sentiment, such as "Neutral", optional "4" is indicative of a sentiment, such as "Positive", and optional "5" is indicative of a sentiment, such as "Very positive".

In one or more exemplary methods, the primary set of sentiment type identifiers ST_ID_SET_1 is given by:

ST_ID_SET_1={"Very negative","Negative","Neutral","Positive","Very positive"}, e.g. where "Very negative" and/or "Very positive" is optional.

In one or more exemplary methods, the primary set of sentiment type identifiers ST_ID_SET_1 is given by:

ST_ID_SET_1={1,2,3,4,5}, where "1" is indicative of a sentiment, such as "Angry", "2" is indicative of a sentiment, such as "Low Energy", "3" is indicative of a sentiment, such as "OK Energy", optional "4" is indicative of a sentiment, such as "Friendly, engaged, energetic", and optional "5" is indicative of a sentiment, such as "Highly engaged".

A set of sentiment type identifiers, such as the primary set of sentiment type identifiers and/or the secondary set of sentiment type identifiers, may comprise at least three or at least four different sentiment type identifiers, such as five, six, seven, eight, nine, or more sentiment type identifiers. In other words, each sentiment or sentiment type may have a corresponding ST_ID_1_$i$. For example, the first primary sentiment metric SM_1_1 may comprise a first primary sentiment type identifier ST_ID_1_1 indicative of or corresponding to the primary sentiment state or the first speaker state being "positive".

A first sentiment metric SM_1_$i$ may comprise a sentiment level, also denoted SL_1_$i$, i=1, 2, ..., O, where O is the number of sentiment levels. In other words, determining SM_1_$i$ may comprise determining SL_1_$i$, e.g. determining SM_1_1 may comprise determining a first primary sentiment level SL_1_1. A sentiment level SL_1_$i$ may indicate a level of the i'th sentiment type. In other words, SL_1_$i$ may indicate a degree of the i'th sentiment type. For example, when ST_ID_1_1 corresponds to the first speaker state "positive", a first primary sentiment level SL_1_1 may be indicative of or correspond to a degree of the sentiment "positive", e.g. at a scale, e.g. from 0 to 1 or from 1 to 10, or selected from "low", "medium", and "high". In other words, a sentiment level of a sentiment metric may be on a scale, e.g. from 0 to 1 or from 1 to 10.

A first sentiment metric SM_1_$i$ may comprise a confidence score, respectively denoted SCS_1_$i$, i=1, 2, ..., P, where P is the number of confidence scores. In other words, determining SM_1_$i$ may comprise determining a first confidence score SCS_1_$i$, e.g. determining first primary sentiment metric SM_1_1 may comprise determining a first primary confidence score SCS_1_1. A confidence score of a sentiment metric may be indicative of a score or a probability of the determined sentiment metric, e.g. sentiment type identifier and/or sentiment level, being correct, e.g. the sentiment state or sentiment type (as identified by the sentiment type identifier of the sentiment metric) being correct. For example, SCS_1_1=0.88 may be indicative of a probability of 88% that the determined ST_ID_1_1, e.g. being "positive", is correct.

Determining one or more first sentiment metrics indicative of a first speaker state may comprise extracting one or more speaker features from the first audio signal, e.g. wherein the one or more first sentiment metrics are based on the one or more speaker features. The one or more speaker features may comprise paralinguistic features. The one or more speaker features may for example comprise a speaker tone feature, a speaker intonation feature, a speaker power or volume feature, a speaker pitch feature, a speaker voice quality feature, a linguistic feature, an acoustic feature, and/or a speaker spectral band energy feature. A spectral band energy feature may comprise individual bins of spectrograms indicating a signal energy level at a given frequency.

In one or more exemplary methods, the one or more first sentiment metrics SM_1_$i$ includes a first secondary sentiment metric also denoted SM_1_2, indicative of a secondary sentiment state of the first speaker. The first secondary sentiment metric SM_1_2 may be indicative of a secondary sentiment of the first speaker in the first conversation period and/or the second conversation period.

The secondary sentiment state may be different from the primary sentiment state. In other words, SM_1_2 may be indicative of a secondary emotion of the first speaker. SM_1_2 may be a less dominating sentiment state than the primary sentiment state and/or a second sentiment state in time of the first speaker. The secondary sentiment state may be one of disappointed, bored, afraid, sad, negative, frustrated, annoyed, fearful, panicking, hesitant, dissatisfied, angry, surprised, worried, wondering, not understanding, thinking, neutral, positive, very positive, glad, friendly, confident, excited, pleased, satisfied, aroused, content, relaxed, energetic, enthusiastic, service-minded, friendly, polite, helpful, interested, and happy.

In one or more exemplary methods/systems, the secondary sentiment state of the first speaker may be selected from a secondary set of sentiment states.

A first sentiment metric SM_1_$i$ may comprise a first sentiment type identifier, also denoted ST_ID_1_$i$, where i is an index. In other words, determining one or more first sentiment metrics SM_1_$i$ may comprise determining a first sentiment type identifier ST_ID_1_$i$, e.g. a first secondary sentiment type identifier ST_ID_1_2 of the first secondary sentiment metric SM_1_2. A sentiment type identifier is indicative of a sentiment state of a speaker.

A sentiment type identifier may for example be a label, a number or value, such as an integer, corresponding to a specific sentiment (state), a sentiment type and/or a sentiment class. For example, ST_ID_1_$i$ may respectively be selected from the same or different sets of sentiment type identifiers. For example, ST_ID_1_2 may be selected from a secondary set of sentiment type identifiers.

In one or more exemplary methods, the first secondary sentiment metric SM_1_2 comprises a first secondary sentiment type identifier ST_ID_1_2 selected from a secondary set of sentiment type identifiers ST_ID_SET_2, where ST_ID_SET_2 comprises a plurality of sentiment type identifiers, e.g. including at least three, four, five or more sentiment type identifiers.

In one or more exemplary methods, the secondary set of sentiment type identifiers ST_ID_SET_2 is given by:

ST_ID_SET_2={1,2,3,4,5}, where "1" is indicative of a sentiment, such as "Very negative", "2" is indicative of a sentiment, such as "Negative", "3" is indicative of a sentiment, such as "Neutral", optional "4" is indicative of a sentiment, such as "Positive", and optional "5" is indicative of a sentiment, such as "Very positive".

In one or more exemplary methods, the secondary set of sentiment type identifiers ST_ID_SET_2 is given by:

ST_ID_SET_2={"Very negative","Negative","Neutral","Positive","Very positive"}, e.g. where "Very negative" and/or "Very positive" is optional.

In one or more exemplary methods, the secondary set of sentiment type identifiers ST_ID_SET_2 is given by:

ST_ID_SET_2={1,2,3,4,5}, where "1" is indicative of a sentiment, such as "Angry", "2" is indicative of a sentiment, such as "Low Energy", "3" is indicative of a sentiment, such as "OK Energy", optional "4" is indicative of a sentiment, such as "Friendly, engaged, energetic", and optional "5" is indicative of a sentiment, such as "Highly engaged".

A set of sentiment type identifiers, such as the secondary set of sentiment type identifiers and/or the secondary set of sentiment type identifiers, may comprise at least three or at least four different sentiment type identifiers, such as five, six, seven, eight, nine, or more sentiment type identifiers. In other words, each sentiment or sentiment type may have a corresponding ST_ID_1_$i$. For example, the first secondary sentiment metric SM_1_2 may comprise a first secondary sentiment type identifier ST_ID_1_2 indicative of or corresponding to the secondary sentiment state or the first speaker state being "positive".

A first sentiment metric SM_1_$i$ may comprise a sentiment level, also denoted SL_1_$i$, $i=1, 2, \ldots, O$, where O is the number of sentiment levels. In other words, determining SM_1_$i$ may comprise determining SL_1_$i$, e.g. determining SM_1_2 may comprise determining a first secondary sentiment level SL_1_2. A sentiment level SL_1_$i$ may indicate a level of the $i$'th sentiment type. In other words, SL_1_$i$ may indicate a degree of the $i$'th sentiment type. For example, when ST_ID_1_2 corresponds to the first speaker state "positive", a first secondary sentiment level SL_1_2 may be indicative of or correspond to a degree of the sentiment "positive", e.g. at a scale, e.g. from 0 to 1 or from 1 to 10, or selected from "low", "medium", and "high". In other words, a sentiment level of a sentiment metric may be on a scale, e.g. from 0 to 1 or from 1 to 10.

A first sentiment metric SM_1_$i$ may comprise a confidence score, respectively denoted SCS_1_$i$, $i=1, 2, \ldots, P$, where P is the number of confidence scores. In other words, determining SM_1_$i$ may comprise determining a first confidence score SCS_1_$i$, e.g. determining first secondary sentiment metric SM_1_2 may comprise determining a first secondary confidence score SCS_1_2. A confidence score of a sentiment metric may be indicative of a score or a probability of the determined sentiment metric, e.g. sentiment type identifier and/or sentiment level, being correct, e.g. the sentiment state or sentiment type (as identified by the sentiment type identifier of the sentiment metric) being correct. For example, SCS_1_2=0.88 may be indicative of a probability of 88% that the determined ST_ID_1_2, e.g. being "positive", is correct.

The method comprises determining a first performance metric based on a change between the first conversation metric data and the second conversation metric data. The first performance metric may be indicative of a performance of the first speaker and/or the second speaker during the first conversation. For example, the first performance metric may be indicative of a performance of the first speaker being an agent, and how the first speaker performed in handling the second speaker being a caller, during the first conversation.

In one or more exemplary methods, determining a first performance metric comprises determining a change between the first conversation metric data and the second conversation metric data. In other words, determining a first performance metric comprises measuring a difference between the first conversation metric and the second conversation metric. Determining a first performance metric may comprise evaluating the conversation periods, such as the first conversation period, the second conversation period, and/or the third conversation period. For example, determining a first performance metric may comprise evaluating the conversation periods with respect to each other.

Determining a first performance metric may comprise determining a score, such as a first conversation score, and/or determining an evaluation, such as an evaluation of the first conversation. The first performance metric may comprise a score, such as the first conversation score and/or the evaluation of the first conversation. Determining the first performance metric may be based on a change between the first primary speaker metric data and the first secondary speaker metric data and/or a change between the second primary speaker metric data and the second secondary speaker metric data. In other words, determining the first performance metric may be based on a change between the first speaker metric data in the first conversation period and the first speaker metric data in the second conversation period, and/or a change between the second speaker metric data in the first conversation period and the second speaker metric data in the second conversation period. The first performance metric may be indicative of an evolution of the first conversation over time, such as from the first conversation period to the second conversation period. The first performance metric may give an indication to the user of the electronic device about his/her performance or the outcome of the first conversation. By determining the first performance metric based on a change between the first conversation metric data and the second conversation metric data, the first performance metric may be indicative of an evolution of the conversation metric data during the first conversation, e.g. from a difference between an initial phase of the first conversation and an ending phase of the first conversation.

Determining the first performance metric may be based on a change between the sentiment metric data of the first speaker and/or the second speaker in the first conversation period and the sentiment metric data of the first speaker and/or the second speaker in the second conversation period.

Determining the first performance metric may be based on a change between the tone metric data of the first speaker and/or the second speaker in the first conversation period and the tone metric data of the first speaker and/or the second speaker in the second conversation period. In other words, the first performance metric may be based on a change between a sentiment state and/or a tone of a speaker, such as first speaker and/or a second speaker, in the first conversation period and a sentiment state and/or a tone of a speaker, such as first speaker and/or a second speaker, in the second conversation period. The second speaker may for example change from having a sentiment state being "positive" in the first conversation period, to a sentiment state being "negative" in the second conversation period. In this example, a first performance metric being indicative of a negative performance may be determined, because the second speaker went from being positive in the first conversation period to being negative in the second conversation period.

In another example, the second speaker may for example change from having a sentiment state being "very positive" in the first conversation period, to a sentiment state being "neutral" in the second conversation period. In this example, a first performance metric being indicative of a negative performance may be determined, because the second speaker went from being very positive in the first conversation period to being neutral in the second conversation period. The sentiment state of the second speaker was therefore deteriorated during the first conversation when analysing the change between the first conversation metric and the second conversation metric. In comparison, itf the first performance metric would have been determined based on conversation metric data over the whole first conversation and not a change between the first conversation metric data and the second conversation metric data, the first performance metric would have been indicative of a positive performance, because the second speaker was overall positive e.g. when evaluating an average sentiment state over the first conversation. However, the user/first speaker managed to deteriorate the second speaker state (e.g. sentiment state and/or tone) of the second speaker during the first conversation. In other words, the user/first speaker had a negative impact managed to deteriorate the second speaker state (e.g. sentiment state and/or tone) of the second speaker during the first conversation The first performance metric may therefore be determined to be indicative of a negative score and/or a negative outcome of the first conversation.

In another example, the second speaker may for example change from having a sentiment state being "very negative" in the first conversation period, to a sentiment state being "neutral" in the second conversation period. In this example, a first performance metric being indicative of a positive performance may be determined, because the second speaker went from being very negative in the first conversation period to being neutral in the second conversation period. The sentiment state of the second speaker was therefore ameliorated during the first conversation when analysing the change between the first conversation metric and the second conversation metric. In comparison, itf the first performance metric would have been determined based on conversation metric data over the whole first conversation and not a change between the first conversation metric data and the second conversation metric data, the first performance metric would have been indicative of a negative performance, because the second speaker was overall negative e.g. when evaluating an average sentiment state over the first conversation. In other words, the first performance metric would indicate a non-successful conversation/call, even if the caller was turned. However, the user/first speaker managed to ameliorate/improve the second speaker state (e.g. sentiment state and/or tone) of the second speaker during the first conversation. The first performance metric may therefore be determined to be indicative of a positive score and/or a positive outcome of the first conversation.

In one or more exemplary methods, determining a first performance metric comprises applying a first weighting of the first conversation metric and a second weighting of the second conversation metric, where the second weighting is larger than the first weighting.

In other words, a second weighting of the second conversation period may be larger than a first weighting of the first conversation period. All conversation periods, such as conversation segments, are not of equal impact on the first conversation.

For example, by having the second weighting larger than the first weighting, a higher level of importance may be given to the second conversation period, e.g. to the second conversation metric data. During a conversation, the end of the conversation, such as a concluding phase of the conversation, may be of higher importance on the impression left on a speaker of the conversation than a start of the conversation. For example, a caller or customer calling an agent at a support call centre may start the call/conversation (e.g. a first conversation period) having a negative speaker state, e.g. having a negative sentiment state and/or a negative tone (e.g. first conversation metric), because the caller is dissatisfied with something. However, during the conversation (e.g. a third conversation period), the agent may overcome or solve one or more issues that the caller raised in the start of the conversation. Therefore, towards an ending of the conversation (e.g. a second conversation period), the caller may have more positive and satisfied speaker state, e.g. having a positive sentiment state and/or positive tone (e.g. second conversation metric). It may therefore be advantageous to have a larger second weighting than a first weighting. The second conversation metric, such as the second conversation period, may be more important (such as weighted higher) in view of a performance evaluation (e.g. customer satisfaction) because the general impression of the first conversation that the caller will have (such as the general impression that will remain on the caller's side) is the speaker state, such as sentiment state and/or tone, in an ending phase of the first conversation. Nevertheless, the first impression that the agent make on a caller may also be important for the rest of the first conversation. The sentiment state and the tone of the agent in the first conversation period may therefore have an influence on the rest of the first conversation, such as the second conversation period and/or the third conversation period. In other words, it may be important that the agent performs strongly with an energetic, friendly and service-minded voice than it would be deeper into the conversation.

An advantage of determining the first performance metric where a first weighting of the first conversation metric and a second weighting of the second conversation metric are applied, where the second weighting is larger than the first weighting may be that a more realistic and fair evaluation of how a conversation went and/or of the user may be achieved. Further, the first performance metric may give an indication on the influence or the impact of speakers on each other, such as the influence of the first speaker on the speaker state (e.g. sentiment state and/or tone) of the second speaker.

An advantage of determining a first performance metric based on a change between the first conversation metric data and the second conversation metric data may be that the user/first speaker may be provided with a post-conversation evaluation after the call.

An advantage of having a first performance metric output to the user, e.g. after a conversation may be that the user of the electronic device may see or be informed right after a conversation, such as after a call, about his/her performance or the outcome of the conversation e.g. in relation to the sentiment and/or the tone. Furthermore, the user of the electronic device may get a better feedback on his/her performance or on the outcome of the conversation. The first performance metric may provide a gamification of the users' performances. The first performance metric may for example increase the engagement of a user in his/her work, e.g. by being able to visualize an improvement of performances. As discusses above, an advantage of determining the first performance metric based on a change between the first conversation metric data and the second conversation metric data compared to merely based on e.g. an average conversation metric over a conversation, is that a more realistic and fair evaluation of how a conversation went and/or of the user may be achieved. Further, the first performance metric may give an indication on the influence or the impact of speakers on each other, such as the influence of the first speaker on the speaker state (e.g. sentiment state and/or tone) of the second speaker.

The first performance metric may give an indication of whether a speaker has been turned or flipped (e.g. turning a customer from negative to positive or vice-versa) during the first conversation, e.g. between the first conversation period to the second conversation period.

The speaker/user may for example be able to see when a customer/caller have flipped/turned in a conversation, such as the first conversation, e.g. the last conversation/call or streak of conversations/calls, e.g. changed from a negative speaker state to a positive speaker state.

The method comprises outputting, via the interface of the electronic device, the first performance metric.

In one or more exemplary methods, outputting the first performance metric comprises outputting a post-conversation representation based on the first performance metric, e.g. comprising the first performance metric. In other words, outputting the first performance metric comprises outputting a post-conversation visualization (such as time series data visualization).

In one or more exemplary methods, the method comprises detecting a termination of a conversation, such as a termination of the first conversation. In other words, the method comprises detecting a termination of speech. Detecting a termination of the first conversation may comprise detecting a termination of the first speaker and/or the second speaker talking or speaking. A termination of the first conversation may for example be a termination of a call, a termination of a sentence, or a termination of a monologue. A termination of the first conversation may for example be the termination of the second conversation period. Detecting a termination of a conversation may comprise detecting a pause longer e.g. than 5 s, 10 s, 30 s, or 1 min. Detecting a termination of a conversation may comprise detecting a user input, one or more speakers talking to another person, a hang up of a call, and/or calendar data.

In one or more exemplary methods, the method comprises, in accordance with detecting the termination of the first conversation, determining first conversation data based on the first conversation metric data and the second conversation metric data. In one or more exemplary methods, the method comprises transmitting the first conversation data to a server device, e.g. of the system.

In one or more exemplary methods, the method comprises, in accordance with detecting the termination of the first conversation, storing the first conversation data, such as a speaker record, in the memory. In one or more exemplary methods, the first conversation data comprises a first speaker record indicative of one or more of conversation metric data, e.g. first conversation metric data, second conversation metric data, and/or third conversation metric data.

In one or more exemplary methods, the method comprises determining third conversation metric data, also denoted CMD_3, including a third conversation metric, also denoted CM_3, based on the third conversation period CP_3. Determining third conversation metric data CMD_3 may comprise determining the third conversation metric CM_3. Determining third conversation metric data CMD_3 may comprise determining speaker metric data, also denoted SPMD.

In one or more exemplary methods, determining third conversation metric data CMD_3 comprises determining first speaker metric data SPMD_1 of a first speaker in the first conversation, e.g. during the third conversation period CP_3, and/or second speaker metric data SPMD_2 of a second speaker in the first conversation, e.g. during the third conversation period CP_3.

In one or more exemplary methods, the first speaker metric data comprises first tertiary speaker metric data. Determining first speaker metric data SPMD_1 may comprise determining first tertiary speaker metric data, also denoted SPMD_1_3, of the first speaker in the third conversation period. In other words, the first speaker metric data SPMD_1 may comprise first tertiary speaker metric data SPMD_1_3.

Determining first tertiary speaker metric data SPMD_1_3 may comprise determining one or more first tertiary speaker metrics SPM_1_3 of the first speaker over time, e.g. over the third conversation period. In other words, the first speaker metric data SPMD_1 may comprise first tertiary speaker metric data SPMD_1_3. Further, the first speaker metric data may comprise or be indicative of one or more of the first tertiary speaker metric data SPMD_1_3 comprising one or more first tertiary speaker metrics of the first speaker.

Determining second speaker metric data SPMD_2 may comprise determining second tertiary speaker metric data, also denoted SPMD_2_3 of a second speaker in the third conversation period. Determining second tertiary speaker metric data SPMD_2_3 may comprise determining one or more second tertiary speaker metrics SPM_2_3 of the second speaker over time, e.g. over the third conversation period. In other words, the second speaker metric data SPMD_2 may comprise second tertiary speaker metric data SPMD_2_3. Further, the second speaker metric data may comprise or be indicative of one or more of the second tertiary speaker metric data SPMD_2_3 comprising one or more second tertiary speaker metrics.

In one or more exemplary methods, the method comprises, in accordance with detecting the termination of the first conversation, determining a post-conversation representation, also denoted PCR, based on the performance metric, e.g. determining a first post-conversation representation, also denoted PCR_1, based on the first performance metric PM_1.

In one or more exemplary methods, the method comprises, outputting, via the interface of the electronic device, the post-conversation representation PCR, such as the first post-conversation representation PCR_1.

In one or more exemplary methods, determining a post-conversation representation PCR, such as a first post-conversation representation, comprises determining a speaker representation, also denoted SR, based on the performance metric PM, such as the first performance metric PM_1. In one or more exemplary methods, determining a post-conversation representation PCR is based on the first conversation metric and/or the second conversation metric, such as based on the speaker metric data SPMD. A speaker representation may be indicative of a conversation period, such as comprising one or more segments, such as a speech segment or utterance, which is analysed. A speaker representation may be indicative of a conversation, such as the first conversation, which is analysed. For example, a voice activity detection module may identify one or more segments of speech/voice and discard the noise. A segment may for example be a speech segment of at least 5 seconds or at least 10 seconds. The voice activity detection module may detect pauses longer than e.g. 400 ms, 500 ms, or 1 second. A speech segment may be detected when a pause occurs, when another speaker starts speaking, or when a segment reaches a defined maximum length (e.g. at most 8 seconds) may indicate the end of the speech segment. For each speech segment one or more sentiment metrics may be determined. A speaker representation SR may comprise a graphical representation of speech segments of the one or more speakers during a conversation. For example, each speech segment of a conversation may be represented by a speech segment bar. A speech segment bar may have length being proportional with the length of the corresponding speech segment. The speech segment bars may be assigned a colour representing e.g. a conversation metric, a speaker metric such as sentiment metric, and/or a performance metric such as a conversation score, during the corresponding speech segment. For example, a speech segment bar may be assigned a red colour if the corresponding speech segment that the speech segment bar is representing comprised speech of a speaker being unsatisfied. For example, a speech segment bar may be assigned a green colour if the corresponding speech segment that the speech segment bar is representing comprised speech of a speaker being satisfied. In other words, determining a first post-conversation representation PCR_1 comprises determining a first speaker representation, also denoted SR_1, based on the first performance metric, such as based on the first speaker metric data SPMD_1. The first speaker representation SR_1 may be based on one or more of the first conversation metric data CMD_1, such as the first conversation metric CM_1, the second conversation metric data CMD_2, such as the second conversation metric CM_2, and third conversation metric data CMD_3, such as a third conversation metric CM_3. The first speaker representation may be based on one or more of the first primary speaker metric data SPMD_1_1, the first secondary speaker metric data SPMD_1_2, and the first tertiary speaker metric data SPMD_1_3. In one or more exemplary methods, determining the post-conversation representation comprises determining one or more sets of speaker representations, e.g. comprising a first set of speaker representations, a second set of speaker representations, and/or a third set of speaker representations. A set of speaker representations may comprise one or more speaker representations according to this disclosure. Different sets of speaker representations may combine different speaker representations such that the user may be provided with various representations depending on what he/she wants to see. The user may thereby change between the set of speaker representations, e.g. to show different speaker representations indicating different feedback and/or evaluation to the user. For example, the one or more sets of speaker representations may be embodied as a carousel comprising one or more sets of speaker representations that the user may switch between. In other words, the user may switch between different views or user interfaces on the display.

In one or more exemplary methods, determining a first post-conversation representation PCR_1 comprises determining a first primary speaker representation SR_1_1 based on the first conversation metric data CMD_1 and the second conversation metric data CMD_2, and including the first primary speaker representation SR_1_1 in the first post-conversation representation PCR_1.

In other words, determining a first post-conversation representation PCR_1 comprises determining a first primary speaker representation, also denoted SR_1_1, based on the first conversation metric data, such as based on the first primary speaker metric data SPMD_1_1, the first secondary speaker metric data SPMD_1_2, the second primary speaker metric data SPMD_2_1, the second secondary speaker metric data SPMD_2_2.

In one or more exemplary methods, the method comprises including the speaker representation SR in the post-conversation representation PCR. In other words, the method comprises including the first speaker representation SR_1 in the first post-conversation representation PCR_1. The first post-conversation representation PCR_1 may comprise one or more speaker representations, such as one or more of the first speaker representation SR_1, a first primary speaker representation SR_1_1, a first secondary speaker representation SR_1_2, a first tertiary speaker representation SR_1_3, a first quaternary speaker representation SR_1_4, a second speaker representation SR_2, a second primary speaker representation SR_2_1, a second secondary speaker representation SR_2_2, a second tertiary speaker representation SR_2_3, and a second quaternary speaker representation SR_2_4.

In one or more exemplary methods, the first post-conversation representation, e.g. being the first primary speaker representation SR_1_1, comprises a first graph based on the first performance metric PM_1. A post-conversation representation, such as the first post-conversation representation, may comprise one or more of a notification, a badge, an audio icon (such as a sound notification), and a push notification (e.g. to an external device, such as a headset, a mobile phone, an external display device). For example, the first graph may represent the development of the first performance metric during the first conversation. The first primary speaker representation SR_1_1 may be based on the first conversation metric data, such as the first conversation metric, and/or the second conversation metric data, such as the second conversation metric. For example, the first primary speaker representation SR_1_1 may be based on the first primary speaker metric data SPMD_1_1, first secondary speaker metric data SPMD_1_2, and/or first tertiary speaker metric data SPMD_1_3. In one or more exemplary methods, the first primary speaker representation SR_1_1 is indicative of a conversation development score, also denoted CD score, such as call score, of the first speaker, e.g. during the first conversation. The first primary speaker representation SR_1_1 comprises a representation of a conversation development score, e.g. a final conversation development score (such as overall conversation development score), of the first speaker, e.g. during the first conversation. In one or more exemplary embodiments, the first primary speaker representation SR_1_1 the conversation development score may be based on a first conversation score of a first conversation period, e.g. based on the first conversation metric data, such as the first conversation metric, and a second conversation score of a second conversation period, e.g. based on the second conversation metric data, such as the second conversation metric.

In other words, the method comprises determining the first primary speaker representation SR_1_1, based on the sentiment metric data SMD, such as the first primary sentiment metric SM_1_1 and/or the tone metric data TMD, such as the first primary tone metric TM_1_1. Determining SR_1_1 may comprise generating the first primary speaker representation SR_1_1 based on SM_1_1 and/or TM_1_1. The one or more known sentiment and/or tone metrics may be used to improve accuracy of the determination of the speaker representation and/or used to determine the speaker representation.

Thus, determining a first post-conversation representation may comprise determining one or more of SR_1_1, SR_1_2, SR_1_3, SR_1_4, and SR_1_5 based on the first audio signal, such as based on the first performance metric, e.g. based on the first primary speaker metric data SPMD_1_1, the first secondary speaker metric data SPMD_1_2, the first tertiary speaker metric data SPMD_1_3.

The first speaker representation may also be understood as a representation for the user of the electronic device, such as the first speaker, for post-conversation evaluation, e.g. of the first conversation.

The first speaker representation may also be denoted a first person representation of the first conversation, e.g. a last conversation or call.

The first primary speaker representation may be indicative of the first speaker state of the first speaker during the first conversation, e.g. of a last call between an agent and a caller. The first primary speaker representation may be indicative of the first speaker state of the first speaker during different conversation periods of the first conversation, such as the first conversation period, the second conversation period, and/or the third conversation period.

In other words, the first speaker representation, such as the first primary speaker representation, may be a final speaker representation, based on a first performance metric, such as based on a change between the first conversation metric data and the second conversation metric data.

The first speaker representation may be indicative of or reflect an evaluation of the first conversation based on a first performance metric.

The first speaker representation may be based on a change between sentiment metric data and/or tone metric data, in relation to a first speaker, of the first conversation period and sentiment metric data and/or tone metric data of the second conversation period.

An advantage of having a post-conversation representation, e.g. after a conversation may be that the user of the electronic device may see or be informed right after a conversation, such as call, about his/her performance or the outcome of the conversation in relation to the first performance metric, such as the first conversation metric data and the second conversation metric data, e.g. in relation to the sentiment and/or the tone of the second speaker. Furthermore, the user of the electronic device may get a better feedback on his/her performance or on the outcome of the conversation. The post-conversation representation may provide a gamification of the users' performances. The post-conversation representation may for example increase the engagement of a user in his/her work, e.g. by being able to visualize an improvement of performances.

The first speaker representation may comprise graphical representations, such as animations, graphs, trends, and/or scoreboards.

The first speaker representation may comprise sound representations, such as auditory feedback and/or audio icons.

In one or more exemplary methods, outputting the first post-conversation representation may comprise outputting, via the interface of the electronic device, the first speaker representation SR_1. Outputting the first post-conversation representation PCR_1 may comprise displaying a first user interface indicative of the post-conversation representation. In one or more exemplary methods, outputting the first post-conversation representation PCR_1 may comprise outputting, via the interface of the electronic device, one or more of the first primary speaker representation SR_1_1, the first secondary speaker representation SR_1_2, the first tertiary speaker representation SR_1_3, and the first quaternary speaker representation SR_1_4.

Outputting the first speaker representation SR_1 may comprise displaying a first user interface indicative of the first speaker representation.

A user interface may comprise one or more, such as a plurality of, user interface objects. For example, the first user interface may comprise one or more first user interface objects, such as a first primary user interface object and/or a first secondary user interface object. A user interface object may refer herein to a graphical representation of an object that is displayed on an interface of the electronic device, such as a display. The user interface object may be user-interactive, or selectable by a user input. For example, an image (e.g., icon), a button, and text (e.g., hyperlink) each optionally constituting a user interface object. The user interface object may form part of a widget. A widget may be seen as a mini-application that may be used by the user.

In one or more exemplary methods, the method comprises determining a first secondary speaker representation SR_1_2 based on the first speaker metric data SPMD_1, e.g. on the first secondary speaker metric data SPMD_1_2, and including the first secondary speaker representation SR_1_2 in the first post-conversation representation PCR_1.

In one or more exemplary methods, the first speaker representation SR_1, such as the first secondary speaker representation SR_1_2, is based on historic first speaker metric data SPMD_1, such as first secondary speaker metric data SPMD_1_2. The term historic first speaker metric data may be understood as first speaker metric data based one or more historic or previous conversations or calls.

In one or more exemplary methods, the first secondary speaker representation SR_1_2 comprises a representation of a number X of historic conversations, e.g. before the first conversation or including the first conversation, based on historic first secondary speaker metric data of historic conversations. For example, X may be a number of past or historic conversations, such as X=5 the first secondary speaker representation SR_1_2 comprises a representation of the last five conversations of the first speaker, such as the last five calls of an agent and/or a caller. Alternatively or additionally, the first secondary speaker representation SR_1_2 comprises a representation of the last five conversations of a team of the user/speaker, e.g. for the user to be able to compare his/her performances to his/her teammates. The first secondary speaker representation SR_1_2 may comprise a representation indicating that the first conversation, e.g. the last conversation, has been the best conversation of the day, the best conversation of the week, the best conversation of the month, and/or the best conversation of the year for the first speaker (e.g. a caller and/or agent). In other words, the first secondary speaker representation SR_1_2 may comprise a representation indicating that the first conversation has been the conversation where the first speaker (e.g. caller and/or agent) have had the best performance, e.g. the best conversation score, within a certain period.

In one or more exemplary methods, the first secondary speaker metric data SPMD_1_2 is tone metric data, also denoted TMD. Determining first secondary speaker metric data SPMD_1_2 may comprise determining tone metric data. In one or more exemplary methods, determining first secondary speaker metric data SPMD_1_2 may comprise determining one or more first tone metrics, also denoted TM_1_$i$, i=1, 2, . . . , m, where m is the number of first tone metrics. In other words, the tone metric data TMD may comprise one or more first tone metrics over time, e.g. over the first conversation period.

In one or more exemplary methods, determining a first post-conversation representation comprises determining a first tertiary speaker representation, also denoted SR_1_3, based on first speaker metric data SPMD_1 and including the first tertiary speaker representation SR_1_3 in the first post-conversation representation PCR_1.

In one or more exemplary methods, the first tertiary speaker representation is indicative of a sentiment distribution of the first speaker during the first conversation.

In one or more exemplary methods, the first tertiary speaker representation SR_1_3 comprises a representation of a sentiment distribution of the first speaker and/or the second speaker, e.g. during the first conversation and/or during the first conversation period, the second conversation period, and/or the third conversation period. Determining a first tertiary speaker representation SR_1_3 may be based on the first conversation metric data, the second conversation metric data, and/or the third conversation metric data, e.g. being sentiment metric data SMD and/or tone metric data TMD. The first tertiary speaker representation SR_1_3 may comprise a representation of a sentiment distribution of one or more first sentiment type identifiers ST_ID_1_$i$ of the first speaker, e.g. one or more first speaker states, and/or one or more first sentiment type identifiers ST_ID_2_$i$ of the second speaker, e.g. one or more second speaker states.

In other words, the first tertiary speaker representation SR_1_3 may comprise a representation indicative of a time duration of the first conversation or a time duration of the first speaker speaking during the first conversation, e.g. during the first conversation period, the second conversation period, and/or the third conversation period, during which the first speaker and/or the second speaker have had one or more first sentiment type identifiers ST_ID_1_$i$. A sentiment distribution may for example be, during the first conversation period the first speaker have had the first speaker state "very negative", during the third conversation period the first speaker have had the first speaker state "negative", during the second conversation period the first speaker have had the first speaker state "neutral". A sentiment distribution may for example be, during 20% of the first conversation duration, e.g. being representative of the first conversation period, the first speaker have had the first speaker state "very negative", during 60% of the first conversation duration, e.g. being representative of the third conversation period, the first speaker have had the first speaker state "negative", and during 20% of the first conversation duration, e.g. being representative of the second conversation period, the first speaker have had the first speaker state "neutral". The first tertiary speaker representation SR_1_3 may comprise a representation of a turn or a flip of a speaker (e.g. turning a customer from negative to positive or vice-versa).

The first tertiary speaker representation SR_1_3 may comprise a representation of a sentiment distribution of one or more first sentiment levels SL_1_$i$ of the first speaker and/or one or more first sentiment levels SL_2_$i$ of the second speaker.

The first tertiary speaker representation SR_1_3 may comprise a representation of a sentiment distribution of one or more first confidence scores SCS_1_$i$ of the first speaker and/or one or more second confidence scores SCS_2_$i$ of the second speaker.

In one or more exemplary methods, determining a first post-conversation representation comprises determining a first quaternary speaker representation SR_1_4 based on first speaker metric data SPMD_1 and including the first quaternary speaker representation SR_1_4 in the first post-conversation representation PCR_1. In one or more exemplary methods, the first quaternary speaker representation SR_1_4 is indicative of a conversation score, such as call score, of the first speaker, e.g. during the first conversation.

In one or more exemplary methods, the first quaternary speaker representation SR_1_4 comprises a representation of a first performance metric, such as a conversation score, e.g. a final conversation score, of the first speaker and/or the second speaker, e.g. during the first conversation. Determining a first quaternary speaker representation SR_1_4 may be based on the first primary speaker metric data SPMD_1_1, the first secondary speaker metric data SPMD_1_2, the first tertiary speaker metric data SPMD_1_3, the second primary speaker metric data SPMD_2_1, the second secondary speaker metric data SPMD_2_2, and/or the second tertiary speaker metric data SPMD_2_3, e.g. being sentiment metric data SMD and/or tone metric data TMD. In other words, the first conversation metric data, the second conversation metric data, and/or the third conversation metric data may be used to determine, such as transformed, to a conversation score. The conversation score may be determined based on one or more metrics satisfying one or more criteria or not. The conversation score may be a score between 0 and 20, 0 and 10, or 0 and 5. The conversation score may comprise one, two, or three digits after the decimal point. The first quaternary speaker representation SR_1_4 may comprise a representation indicating that the conversation score, e.g. of the first conversation, e.g. the last conversation, has been the best conversation score of the day, the best conversation score of the week, the best conversation score of the month, and/or the best conversation score of the year for the first speaker and/or the second speaker (e.g. caller and/or agent). In other words, the first quaternary speaker representation SR_1_4 may comprise a representation indicating that the first conversation has been the conversation where the first speaker and/or the second speaker (e.g. caller and/or agent) have had the best performance, e.g. the best conversation score, within a certain period. The first quaternary speaker representation SR_1_4 may comprise a first quaternary colour based on the first performance metric, e.g. based on one or more speaker metric data. For example, when the conversation score is in a first range, a first colour may be assigned to the first quaternary speaker representation SR_1_4.

The first quaternary speaker representation SR_1_4 may comprise a first quaternary size based on the first performance metric, such as based one or more speaker metric data. For example, when the conversation score is in a first range, a first size may be assigned to the first quaternary speaker representation SR_1_4. The first quaternary speaker representation SR_1_4 may comprise a first quaternary height based on the first performance metric, such as based one or more speaker metric data. For example, when the conversation score is in a first range, a first height may be assigned to the first quaternary speaker representation SR_1_4. The first quaternary speaker representation SR_1_4 may comprise a first quaternary animation based on the first performance metric, such as based one or more speaker metric data. For example, when the conversation score is the best of the day, a first animation may be assigned to the first quaternary speaker representation SR_1_4.

In one or more exemplary methods, the one or more audio signals comprising a second audio signal, also denoted AS_2. In one or more exemplary methods, obtaining one or more audio signals comprises obtaining a second audio signal. The second audio signal may be representative of second speech/voice of a second speaker. The second speaker may be a caller, an agent, or a second participant in a telephone conversation or a meeting.

Obtaining one or more audio signals may comprise obtaining one or more audio inputs, such as a second audio input. In other words, the second audio signal may be based on the second audio input. The second audio signal may be obtained from a call or conversation between the user and another person, e.g. a first call or the first conversation. The second speaker may be the person speaking/talking the second most during the first call and/or the first conversation. The second speaker may be the second person speaking during the first call and/or first conversation. The second speaker may be a person speaking with a person of interest, e.g. being the first speaker. The second speaker may be a user wanting a representation of the first speaker, such as the first speaker representation. The second audio signal may be obtained from the electronic device recording second audio input from a second speaker, such as recording the second speaker speaking or talking. Obtaining one or more audio signals may comprise generating one or more audio signals, including the second audio signal. The second audio signal may be based on the second audio input. The second audio signal may comprise a second speaker audio signal. The second audio signal may be an agent audio signal or a caller audio signal, and a second audio signal is the other.

In one or more exemplary methods, determining first conversation metric data CMD_1 and/or determining second conversation metric data CMD_2 comprises determining second speaker metric data, also denoted SPMD_2, of a second speaker based on the second audio signal and based on the first conversation period CP_1 and/or based on the second conversation period CP_2. In one or more exemplary methods, the second speaker metric data SPMD_2 includes second primary speaker metric data SPMD_2_1. In one or more exemplary methods, the first post-conversation representation PCR_1 is based on the second speaker metric data SPMD_2. Determining second primary speaker metric data SPMD_2_1 may comprise determining one or more second primary speaker metrics SM_2_1 over time, e.g. over the first conversation period. In other words, the second speaker metric data SPMD_2 may comprise second primary speaker metric data SPMD_2_1. Further, the second speaker metric data may comprise or be indicative of one or more of the second primary speaker metric data SPMD_2_1 comprising one or more second primary speaker metrics, second secondary speaker metric data SPMD_2_2 comprising one or more second secondary speaker metrics, and second tertiary speaker metric data SPMD_2_3 comprising one or more second tertiary speaker metrics.

In one or more exemplary methods, the second primary speaker metric data SPMD_2_1 is sentiment metric data. The description of the first primary speaker metric data SPMD_1_1 may also apply to the second primary speaker metric data SPMD_2_1, and the description of the first secondary speaker metric data SPMD_1_2 may also apply to the second secondary speaker metric data SPMD_2_2.

The second primary speaker representation is optionally based on the second audio signal for the second speaker and may be a primary speaker representation, e.g. as described in relation to the first primary speaker representation. In other words, the description of the first primary speaker representation may also apply to the second primary speaker representation.

Determining second primary speaker metric data SPMD_2_1 may comprise determining sentiment metric data, also denoted SMD. In one or more exemplary methods, determining second primary speaker metric data SPMD_2_1 may comprise determining one or more second sentiment metrics, also denoted SM_2_$i$, $i=1, 2, \ldots , A$, where A is the number of second sentiment metrics. In other words, the sentiment metric data SMD may comprise one or more second sentiment metrics SM_2 over time, e.g. over the first conversation period.

The one or more second sentiment metrics, such as SM_2_1 and/or SM_2_2, are indicative of a second speaker state, i.e. one or more first sentiment states of the second speaker, and may be based on the first audio signal and/or the second audio signal. The one or more second sentiment metrics SM_2_$i$ may comprise one or more parameters indicative of the second speaker state. The second primary sentiment metric SM_2_1 may be indicative of a second speaker state in the first conversation period and/or the second conversation period. The second secondary sentiment metric SM_2_2 may be indicative of a second speaker state in the first conversation period and/or the second conversation period. The second speaker state of the second speaker may change from the first conversation period to the second conversation period.

The one or more second sentiment metrics SM_2_$i$ include a second primary sentiment metric, also denoted SM_2_1 indicative of a primary sentiment state of a second speaker.

In other words, SM_2_1 may be indicative of a primary emotion of the second speaker. SM_2_1 may be indicative of a dominating sentiment state and/or a second sentiment state in time of the second speaker, e.g. during the first conversation period and/or the second conversation period. The primary sentiment state may be one of disappointed, bored, afraid, sad, negative, very negative, frustrated, annoyed, fearful, panicking, hesitant, dissatisfied, angry, surprised, worried, wondering, not understanding, thinking, neutral, positive, very positive, glad, friendly, confident, excited, pleased, satisfied, aroused, content, relaxed, energetic, enthusiastic, service-minded, friendly, polite, helpful, interested, and happy. In one or more exemplary methods/systems, the primary sentiment state of the second speaker may be selected from a primary set of sentiment states. Each of the first conversation metric data and the second conversation metric data may comprise one or more second sentiment metrics, such as a second primary sentiment metric SM_2_1 and a second secondary sentiment metric SM_2_2.

A second sentiment metric SM_2_i may comprise a second sentiment type identifier, also denoted ST_ID_2_i, i=1, 2, . . . B, where B is the number of second sentiment type identifiers, where i is an index. In other words, determining one or more second sentiment metrics SM_2_i may comprise determining a second sentiment type identifier ST_ID_2_i, e.g. a second primary sentiment type identifier ST_ID_2_1 of the second primary sentiment metric SM_2_1. A sentiment type identifier is indicative of a sentiment state of a speaker.

A sentiment type identifier may for example be a label, a number or value, such as an integer, corresponding to a specific sentiment (state), a sentiment type and/or a sentiment class. For example, ST_ID_2_i may respectively be selected from the same or different sets of sentiment type identifiers. For example, ST_ID_2_1 may be selected from a primary set of sentiment type identifiers and/or ST_ID_2_2 may be selected from a secondary set of sentiment type identifiers. The primary set of sentiment type identifiers may be different from or the same as the secondary set of sentiment type identifiers. The primary set of sentiment type identifiers and the secondary set of sentiment type identifiers may share one or more, such as a plurality of, sentiment type identifiers.

In one or more exemplary methods, the second primary sentiment metric SM_2_1 comprises a second primary sentiment type identifier ST_ID_2_1 selected from a primary set of sentiment type identifiers ST_ID_SET_1, where ST_ID_SET_1 comprises a plurality of sentiment type identifiers, e.g. including at least three, four, five or more sentiment type identifiers.

In one or more exemplary methods, the primary set of sentiment type identifiers ST_ID_SET_1 is given by:

ST_ID_SET_1={1,2,3,4,5}, where "1" is indicative of a sentiment, such as "Very negative", "2" is indicative of a sentiment, such as "Negative", "3" is indicative of a sentiment, such as "Neutral", optional "4" is indicative of a sentiment, such as "Positive", and optional "5" is indicative of a sentiment, such as "Very positive".

In one or more exemplary methods, the primary set of sentiment type identifiers ST_ID_SET_1 is given by:

ST_ID_SET_1={"Very negative","Negative","Neutral","Positive","Very positive"}, e.g. where "Very negative" and/or "Very positive" is optional.

In one or more exemplary methods, the primary set of sentiment type identifiers ST_ID_SET_1 is given by:

ST_ID_SET_1={1,2,3,4,5}, where "1" is indicative of a sentiment, such as "Angry", "2" is indicative of a sentiment, such as "Low Energy", "3" is indicative of a sentiment, such as "OK Energy", optional "4" is indicative of a sentiment, such as "Friendly, engaged, energetic", and optional "5" is indicative of a sentiment, such as "Highly engaged".

A set of sentiment type identifiers, such as the primary set of sentiment type identifiers and/or the secondary set of sentiment type identifiers, may comprise at least three or at least four different sentiment type identifiers, such as five, six, seven, eight, nine, or more sentiment type identifiers. In other words, each sentiment or sentiment type may have a corresponding ST_ID_2_i. For example, the second primary sentiment metric SM_2_1 may comprise a second primary sentiment type identifier ST_ID_2_1 indicative of or corresponding to the primary sentiment state or the second speaker state being "positive".

A second sentiment metric SM_2_1 may comprise a sentiment level, also denoted SL_2_i, 1=1, 2, . . . , C, where C is the number of sentiment levels. In other words, determining SM_2_i may comprise determining SL_2_i, e.g. determining SM_2_1 may comprise determining a second primary sentiment level SL_2_1. A sentiment level SL_2_i may indicate a level of the i'th sentiment type. In other words, SL_2_i may indicate a degree of the i'th sentiment type. For example, when ST_ID_2_1 corresponds to the second speaker state "positive", a second primary sentiment level SL_2_1 may be indicative of or correspond to a degree of the sentiment "positive", e.g. at a scale, e.g. from 0 to 1 or from 1 to 10, or selected from "low", "medium", and "high". In other words, a sentiment level of a sentiment metric may be on a scale, e.g. from 0 to 1 or from 1 to 10.

A second sentiment metric SM_2_1 may comprise a confidence score, respectively denoted SCS_2_i, i=1, 2, . . . , C, where C is the number of confidence scores. In other words, determining SM_2_i may comprise determining a second confidence score SCS_2_i, e.g. determining second primary sentiment metric SM_2_1 may comprise determining a second primary confidence score SCS_2_1. A confidence score of a sentiment metric may be indicative of a score or a probability of the determined sentiment metric, e.g. sentiment type identifier and/or sentiment level, being correct, e.g. the sentiment state or sentiment type (as identified by the sentiment type identifier of the sentiment metric) being correct. For example, SCS_2_1=0.88 may be indicative of a probability of 88% that the determined ST_ID_2_1, e.g. being "positive", is correct.

Determining one or more second sentiment metrics indicative of a second speaker state may comprise extracting one or more speaker features from the second audio signal, e.g. wherein the one or more second sentiment metrics are based on the one or more speaker features. The one or more speaker features may comprise paralinguistic features. The one or more speaker features may for example comprise a speaker tone feature, a speaker intonation feature, a speaker power or volume feature, a speaker pitch feature, a speaker voice quality feature, a linguistic feature, an acoustic feature, and/or a speaker spectral band energy feature. A spectral band energy feature may comprise individual bins of spectrograms indicating a signal energy level at a given frequency.

In one or more exemplary methods, the one or more second sentiment metrics SM_2_i includes a second secondary sentiment metric also denoted SM_2_2, indicative of a secondary sentiment state of the second speaker. The second secondary sentiment metric SM_2_2 may be indicative of a secondary sentiment of the second speaker in the first conversation period and/or the second conversation period. For the description of the second secondary sentiment metric SM_2_2 of the second speaker, it is referred back to the description of the first secondary sentiment metric SM_1_2 of the first speaker. The description of the first secondary sentiment metric SM_1_2 of the first speaker may also apply to the description of the secondary sentiment metric SM_2_2.

The second speaker representation may also be denoted a second person representation of the first conversation or during the first conversation, e.g. a last conversation or call.

The second primary speaker representation may be indicative of the second speaker state and/or a conversation development score of the second speaker during the first conversation, e.g. of a last call between an agent and a caller. The second primary speaker representation may be indicative of the second speaker state of the second speaker during different conversation periods of the first conversation, such as the first conversation period, the second conversation period, and/or the third conversation period.

In other words, the second speaker representation, such as the second primary speaker representation, may be a final speaker representation, based on a first performance metric, such as based on a change between the first conversation metric data and the second conversation metric data. The second speaker representation may be indicative of or reflect an evaluation of the first conversation based on a first performance metric.

The second speaker representation may be based on a change between sentiment metric data and/or tone metric data, in relation to a second speaker, of the first conversation period and sentiment metric data and/or tone metric data of the second conversation period.

The second speaker representation may comprise graphical representations, such as animations, graphs, and/or scoreboards.

The second speaker representation may comprise sound representations, such as auditory feedback and/or audio icons.

In one or more exemplary methods, outputting the first post-conversation representation may comprise outputting, via the interface of the electronic device, the second speaker representation SR_2. Outputting the first post-conversation representation PCR_1 may comprise displaying a second user interface indicative of the post-conversation representation. In one or more exemplary methods, outputting the first post-conversation representation PCR_1 may comprise outputting, via the interface of the electronic device, one or more of the second primary speaker representation SR_2_1, the second secondary speaker representation SR_2_2, the second tertiary speaker representation SR_33, and the second quaternary speaker representation SR_1_4.

Outputting the second speaker representation SR_2 may comprise displaying a second user interface indicative of the second speaker representation.

In one or more exemplary methods, the second speaker metric data comprises second secondary speaker metric data, also denoted SPMD_2_2. Determining second secondary speaker metric data SPMD_2_2 may comprise determining one or more second secondary speaker metrics SM_2_2 over time, e.g. over the second conversation period. In other words, the second speaker metric data SPMD_1 may comprise second secondary speaker metric data SPMD_2_2.

In one or more exemplary methods, the method comprises determining a second secondary speaker representation SR_2_2 based on the second secondary speaker metric data SPMD_2_2 and including the second secondary speaker representation SR_2_2 in the first post-conversation representation PCR_1. The second secondary speaker representation is optionally based on the second audio signal for the second speaker and may be a secondary speaker representation, e.g. as described in relation to the first secondary speaker representation. In other words, the description of the first secondary speaker representation may also apply to the second secondary speaker representation.

In one or more exemplary methods, the second secondary speaker representation SR_2_2 is based on historic second secondary speaker metric data SPMD_2_2.

In one or more exemplary methods, the second secondary speaker representation SR_2_2 comprises a representation of a number X of historic conversations, e.g. before the first conversation or including the first conversation, based on the second secondary speaker metric data. For example, X is a number of past or historic conversations, such as X=5 the second secondary speaker representation SR_2_2 comprises a representation of the last five conversations of the second speaker, such as the last five calls of an agent and/or a caller. The second secondary speaker representation SR_2_2 may comprise a representation indicating that the first conversation, e.g. the last conversation, has been the best conversation of the day, the best conversation of the week, the best conversation of the month, and/or the best conversation of the year for the second speaker (e.g. caller and/or agent). In other words, the second secondary speaker representation SR_2_2 may comprise a representation indicating that the first conversation has been the conversation where the second speaker (e.g. caller and/or agent) have had the best performance, e.g. the best conversation score, within a certain period.

In one or more exemplary methods, the second secondary speaker metric data SPMD_2_2 is tone metric data, also denoted TMD. Determining second secondary speaker metric data SPMD_2_2 may comprise determining tone metric data. In one or more exemplary methods, determining second secondary speaker metric data SPMD_2_2 may comprise determining one or more second tone metrics, also denoted TM_2_i, i=1, 2, . . . , m, where m is the number of second tone metrics. In other words, the tone metric data TMD may comprise one or more second tone metrics over time, e.g. over the second conversation period.

A tone metric is indicative of a tone of a speaker. Tone metric data TMD may be indicative of a mean tone of a speaker over a conversation. Tone metric data TMD may comprise one or more speech metrics. In other words, the tone metric data may comprise one or more speech metrics e.g. interruptions, overtalks, long pauses, high or low speech rate, high or low intonation, turn or flip of a speaker (e.g. turning a customer from negative to positive or vice-versa), and/or responsiveness, such as reaction time (reaction time may be understood as time between turns). The tone metric data may comprise count of events, e.g. count of one or more metrics.

In one or more exemplary methods, the second speaker representation is an agent representation. The agent representation may be a representation of an agent answering calls at a call center, such as a support call center.

An electronic device is disclosed. The electronic device comprises a processor, a memory, and an interface. The electronic device, such as the processor, is configured to perform any of the methods according to this disclosure.

An electronic device is disclosed. The electronic device comprising a processor, a memory, and an interface. The processor is configured to obtain one or more audio signals including a first audio signal during a first conversation.

The electronic device may for example comprise one or more of a mobile phone, a computer, and a tablet. The electronic device may for example be a user device, such as a mobile phone or a computer, configured to perform a call between a user and another person. The electronic device may be configured to obtain first audio input, such as first audio input from the call between the user and another person. For example, the electronic device may act as call agent device where the user may be an agent, such as an agent of a call center, such as a support call center, an after sales call center, a marketing call center, or a sales call center. The electronic device may for example be a user device, such as a mobile phone or a computer, configured to record first audio input from a first speaker, such as record the first speaker speaking or talking. The electronic device may be configured to obtain one or more audio signals, such as generate one or more audio signals, including a first audio signal. The first audio signal may be based on the first audio input.

The electronic device, such as using the processor, is configured to determine a first conversation period of the first conversation, the first conversation period having a first duration. The electronic device, such as using the processor, is configured to determine first conversation metric data including a first conversation metric based on the first conversation period. The electronic device, such as using the processor, is configured to determine a second conversation period of the first conversation, the second conversation period having a second duration. The electronic device, such as using the processor, is configured to determine second conversation metric data including a second conversation metric based on the second conversation period. The electronic device, such as using the processor, is configured to determine a first performance metric based on a change between the first conversation metric data and the second conversation metric data. The electronic device, such as using the processor, is configured to output, via the interface, the first performance metric.

The interface of the electronic device may comprise a first display. Optionally, the system may comprise a second interface, such as a second display, being separate from the electronic device. The second interface may act as a display instead of the interface of the electronic device. The first display of the electronic device may be configured to detect a user input, such as a first primary user input. The user input may comprise a touch input from the user, for example when the first display comprises a touch-sensitive display. The user input may comprise a contact on the touch sensitive display and/or a keyboard comprised in or connected to the electronic device. A touch-sensitive display may provide a first user interface and/or a second user interface (such as an input interface) and an output interface between the electronic device and the user. The processor of the electronic device may be configured to receive and/or send electrical signals from/to touch-sensitive display. A touch-sensitive display may be configured to display visual output to the user, e.g. the first speaker representation and/or the second speaker representation. The visual output optionally includes graphics, text, icons, video, audio icons, and any combination thereof (collectively termed "graphics"). For example, some, most, or all of the visual output may be seen as corresponding to user-interface objects. The electronic device may also be configured to output first speaker representations comprising audio output, such as sound representations, audio icons, and/or auditory feedback.

The processor of the electronic device may be configured to display, on the interface, e.g. first display, one or more user interfaces, such as user interface screens, including a first user interface and/or a second user interface. A user interface may comprise one or more, such as a plurality of user interface objects. For example, the first user interface may comprise a first primary user interface object and/or a first secondary user interface object. A second user interface may comprise a second primary user interface object and/or a second secondary user interface object. A user interface may be referred to as a user interface screen.

An input, such as the user input, may comprise a touch (e.g. a tap, a force touch, a long press), a click (such as a mouse click), a typing (such as a typing on a keyboard), an audio input (such as a voice assistant), and/or a movement of contact (e.g. a swipe gesture, e.g. for toggling). The movement on contact may be detected by a touch sensitive surface, e.g. on the first display of the electronic device. Thus, the first display may be a touch sensitive display. The first input (such as first user input) may comprise a lift off. A user input, such as the first primary user input, the second primary user input and/or the second secondary user input, may comprise a touch and a movement followed by a lift off.

A system is disclosed. The system comprises a server device and an electronic device. The electronic device is an electronic device according to this disclosure.

The system may be a system for monitoring, handling, evaluating, and/or analysing one or more audio signals, such as a speaker talking, e.g. as a monologue. The system may be a system for monitoring, handling, evaluating, and/or analysing one or more audio signals, such as a conversation, e.g. between two or more people, such as a conversation in a phone call or a meeting. The system may for example comprise or act as a call center system for monitoring, handling, and/or analysing one or more audio signals, such as conversations between two or more people, e.g. a phone call between an agent of the call center system and a customer or caller.

It is to be understood that a description of a feature in relation to method(s) is also applicable to the corresponding feature in the electronic device, server device, and/or system.

FIG. 1 schematically illustrates an exemplary system, such as system 2, with post-conversation evaluation according to the present disclosure. The system 2 comprises an electronic device 10 and optionally a server device 20. The electronic device 10 comprises a memory 10A, one or more interfaces 10B, and a processor 10C. The server device 20 comprises a memory 20A, one or more interfaces 20B, and one or more processors 20C. A user 1A may use the electronic device 10, e.g. being a mobile phone or a computer, for performing or receiving a call from a speaker 1B, e.g. a first speaker. The speaker 1B may use a speaker electronic device 30 for communicating with the user 1A.

The electronic device 10 may be configured to act as a user device that the user 1A may use for communicating and/or monitoring a call/conversation with the speaker 1B. The electronic device/processor 10C is configured to obtain 14 one or more audio signals including a first audio signal. The first audio signal may be obtained 22 from the speaker electronic device 30, e.g. via a network 40 such as a global network, e.g. the internet or a telecommunications network. The first audio signal may be obtained 14 from the server device 20, e.g. via the network 40 such as a global network, e.g. the internet or a telecommunications network.

The speaker electronic device 30 may be configured to record audio input 32, such as first audio input, from the speaker 1B, such as record the speaker 1B speaking or talking. The speaker electronic device 30 may be configured to obtain one or more audio signals, such as generate one or more audio signals based on the audio input 32, including a first audio signal based on the first audio input. The speaker electronic device 30 may be configured to transmit 22 the first audio signal to the electronic device 10, e.g. via the network 40. The speaker electronic device 30 may be configured to obtain 24 one or more audio signals from the electronic device 10, e.g. based on user input 4, such as user audio input. The user input 4 may be the user 1A speaking or talking, e.g. the electronic device 10 recording the user 1A speaking or talking. The user 1A may be the first speaker and/or a second speaker.

The electronic device/processor 10C is configured to determine a first conversation period of the first conversation, the first conversation period having a first duration, e.g. based on the first audio signal and/or a second audio signal.

The electronic device/processor 10C is configured to determine first conversation metric data including a first conversation metric based on the first conversation period.

Optionally, the one or more processors 20C are configured to determine the first conversation period of the first conversation and/or the first conversation metric data based on the first conversation period. The processor 10C may then be configured to obtain 14 the first conversation period (e.g. information relating to the first conversation period) and/or the first conversation metric data from the server device 20, e.g. via the network 40. The processor 20C may be configured to transmit 18 the first conversation period and/or the first conversation metric data to the electronic device 10, e.g. via the network 40. The processor 20C may be configured to transmit 18 the first conversation period and/or the first conversation metric data, to the electronic device 10, e.g. via the network 40.

The processor 10C is optionally configured to determine a second conversation period of the first conversation, the second conversation period having a second duration, e.g. based on the first audio signal and/or a second audio signal.

The electronic device/processor 10C is optionally configured to determine second conversation metric data including a second conversation metric based on the second conversation period.

Optionally, the one or more processors 20C are configured to determine the second conversation period of the first conversation and/or the second conversation metric data based on the second conversation period. The processor 10C may then be configured to obtain 14 the second conversation period (e.g. information relating to the second conversation period) and/or the second conversation metric data from the server device 20, e.g. via the network 40. The processor 20C may be configured to transmit 18 the second conversation period and/or the second conversation metric data to the electronic device 10, e.g. via the network 40. The processor 20C may be configured to transmit 18 the second conversation period and/or the second conversation metric data, to the electronic device 10, e.g. via the network 40.

The processor 10C is optionally configured to determine a first performance metric based on a change between the first conversation metric data and the second conversation metric data.

Optionally, the processor 20C is configured to determine a first performance metric based on a change between the first conversation metric data and the second conversation metric data. The processor 10C may then be configured to obtain 14 the first performance metric, from the server device 20, e.g. via the network 40. The processor 20C may be configured to transmit 18 the first performance metric to the electronic device 10, e.g. via the network 40.

The processor 10C is optionally configured to output 6, via the interface 10B, the first performance metric.

The processor 10C is optionally configured to detect a termination of the first conversation, e.g. a termination of speech, such as a termination, an end, or a hold of a call, and in accordance with the detection of the termination of the first conversation/speech/call, to determine a first post-conversation representation based on the first performance metric. The processor 10C may be configured to output 6, via the interface 10B, the first post-conversation representation.

The processor 10C may in accordance with detecting the termination of the first conversation, be configured to determine first conversation data based on the first conversation metric data and the second conversation metric data. The processor 10C may be configured to transmit 12 the first conversation data to the server device 20 of the system 2.

The processor 10C may in accordance with detecting the termination of the first conversation, be configured to store the first conversation data, such as a speaker record, in the memory 10A. In one or more exemplary electronic devices and/or methods, the first conversation data comprises a first speaker record indicative of one or more of first conversation metric data, e.g. speaker metric data, first primary speaker metric data and/or second primary speaker metric data, second conversation metric data, e.g. first secondary speaker metric data and/or second secondary speaker metric data, and/or third conversation metric data, e.g. first tertiary speaker metric data and/or second tertiary speaker metric data.

Optionally, the processor 20C is configured to determine the first post-conversation representation based on the first performance metric. The processor 10C may then be configured to obtain 14 the first post-conversation representation from the server device 20, e.g. via the network 40. The processor 20C may be configured to transmit 18 the first post-conversation representation, to the electronic device 10, e.g. via the network 40.

Figure 2A:
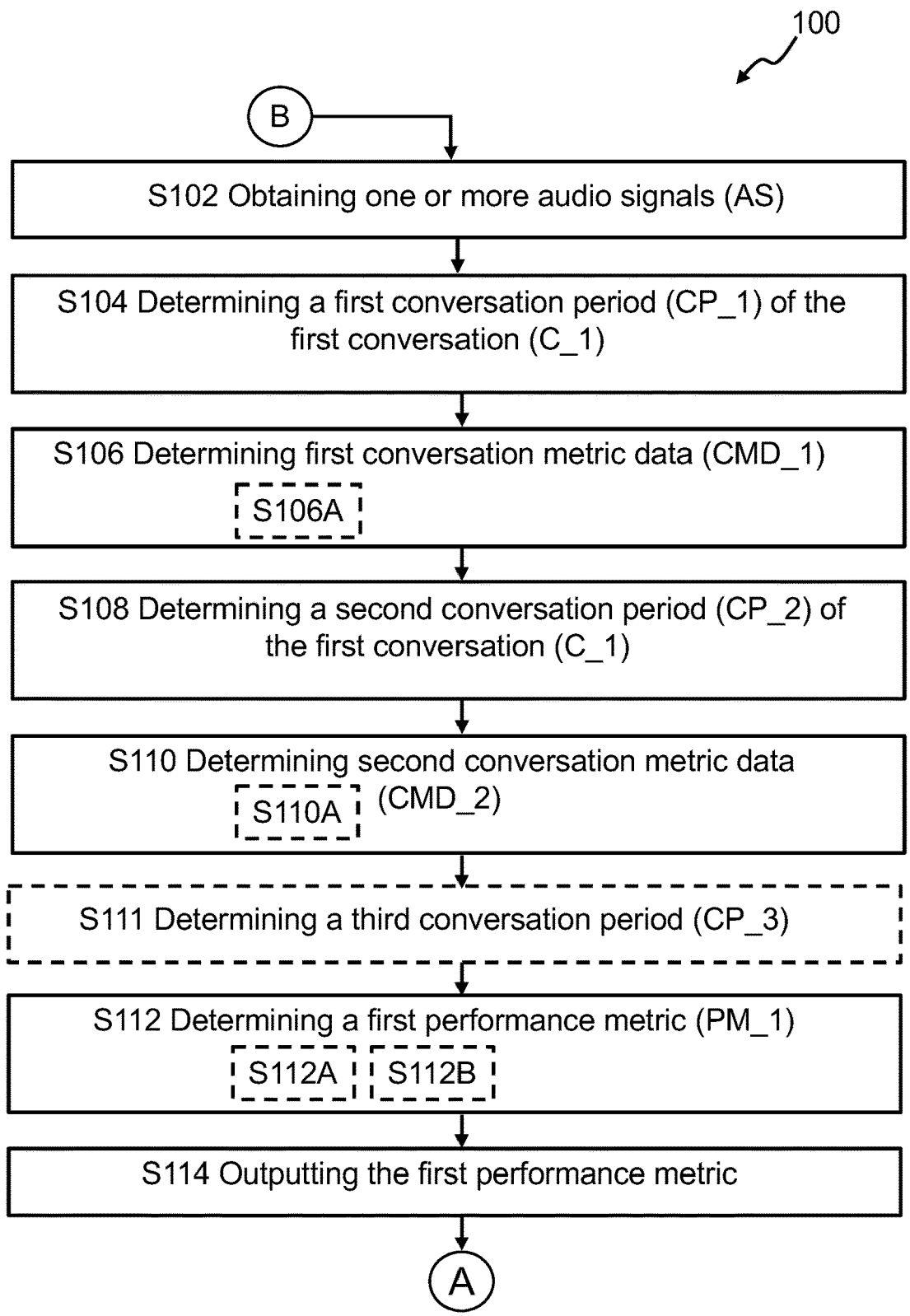
FIGS. 2A-B are flow diagrams of an exemplary method according to the present disclosure, FIG. 3 schematically illustrates an exemplary electronic device according to the present disclosure, FIG. 4 schematically illustrates an exemplary system comprising a server device and an electronic device according to the present disclosure, and FIG. 5. schematically illustrates an exemplary data structure according to the present disclosure.
Figure 2B:
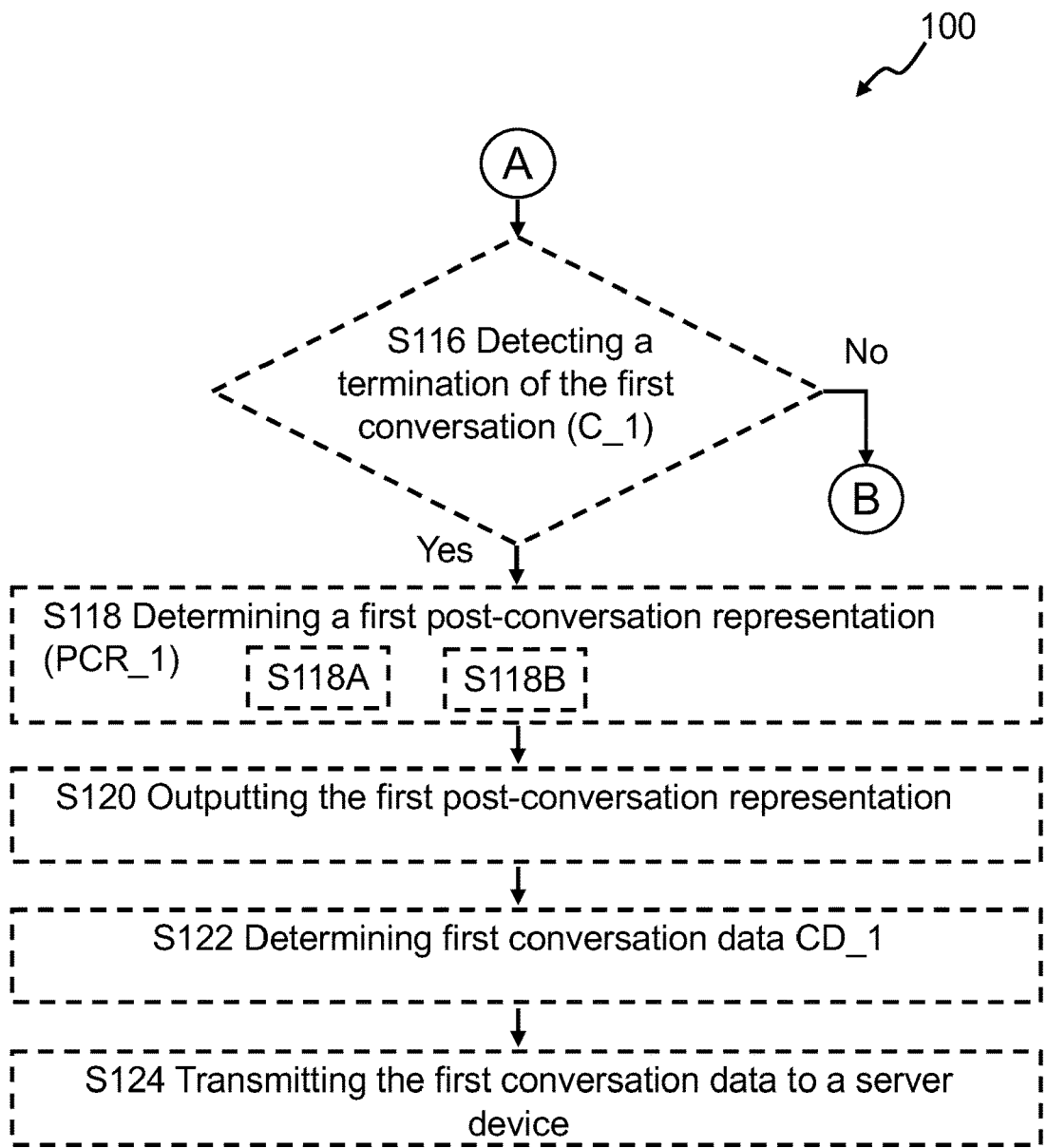

The electronic device 10 may be configured to perform any of the methods disclosed in FIGS. 2A, 2B.

The processor 10C is optionally configured to perform any of the operations disclosed in FIGS. 2A-2B (such as any one or more of S106A, S110A, S111, S112A, S112B, S116, S118, S118A, S120, S122, S124). The operations of the electronic device may be embodied in the form of executable logic routines (for example, lines of code, software programs, etc.) that are stored on a non-transitory computer readable medium (for example, memory 10A) and are executed by the processor 10C).

The processor 20C is optionally configured to perform any of the operations disclosed in FIGS. 2A-2B (such as any one or more of S106A S110A, S111, S112A, S112B, S116, S118, S118A, S120, S122, S124). The operations of the server device may be embodied in the form of executable logic routines (for example, lines of code, software programs, etc.) that are stored on a non-transitory computer readable medium (for example, memory 20A) and are executed by the processor 20C).

Furthermore, the operations of the electronic device 10 may be considered a method that the electronic device 10 is configured to carry out. Also, while the described functions and operations may be implemented in software, such functionality may as well be carried out via dedicated hardware or firmware, or some combination of hardware, firmware and/or software.

FIGS. 2A and 2B show a flow diagram of an exemplary method. A method 100 of operating a system comprising an electronic device is disclosed. The electronic device comprises an interface, a processor, and a memory. The method 100 comprises obtaining S102 one or more audio signals including a first audio signal AS_1 of a first conversation, e.g. of a first speaker, and optionally a second audio signal AS_2, of the first conversation of a second speaker. The method 100 comprises determining S104 a first conversation period CP_1 of the first conversation C_1, the first conversation period CP_1 having a first duration.

The method 100 comprises determining S106 first conversation metric data CMD_1 including a first conversation metric CM_1 based on the first conversation period CP_1.

Optionally, determining S106 first conversation metric data CMD_1 comprises determining S106A first speaker metric data SPMD_1 of a first speaker in the first conversation C_1 and/or second speaker metric data SPMD_2 of a second speaker in the first conversation C_1.

The method 100 comprises determining S108 a second conversation period CP_2 of the first conversation C_1, the second conversation period CP_2 having a second duration.

The method 100 comprises determining S110 second conversation metric data CMD_2 including a second conversation metric CM_2 based on the second conversation period CP_2.

Optionally, determining S110 second conversation metric data CMD_2 comprises determining S110A first speaker metric data SPMD_1 of a first speaker in the first conversation C_1 and/or second speaker metric data SPMD_2 of a second speaker in the first conversation C_1.

Optionally, the method 100 comprises determining S111 a third conversation period CP_3 having a third duration and being associated with a third phase of the first conversation C_1.

The method 100 comprises determining S112 a first performance metric PM_1 based on a change between the first conversation metric data CMD_1 and the second conversation metric data CMD_2.

Optionally, determining S112 a first performance metric PM_1 comprises determining S112A a change between the first conversation metric data CMD_1 and the second conversation metric data CMD_2.

Optionally, determining S112 a first performance metric PM_1 comprises applying S112B a first weighting of the first conversation metric CM_1 and a second weighting of the second conversation metric CM_2, where the second weighting is larger than the first weighting.

The method 100 comprises outputting S114, via the interface of the electronic device, the first performance metric PM_1.

Optionally, the method 100 comprises detecting S116 a termination of the first conversation C_1.

Optionally, in accordance with detecting S116 the termination of the first conversation C_1, the method 100 comprises determining S118 a first post-conversation representation PCR_1 based on the first performance metric PM_1.

Optionally, when a termination of the first conversation C_1 is not detected, the method 100 comprises restarting or reiterating B the method 100.

Optionally, determining S118 a first post-conversation representation PCR_1 comprises determining S118A a first primary speaker representation SR_1_1 based on the first conversation metric data CMD_1 and the second conversation metric data CMD_2, and including S118B the first primary speaker representation SR_1_1 in the first post-conversation representation PCR_1.

Optionally, the method 100 comprises outputting S120, via the interface of the electronic device, the first post-conversation representation PCR_1.

Determining S118 a post-conversation representation PCR may comprise determining a first post-conversation representation PCR_1 based on the first speaker metric data and/or the second speaker metric data. Determining S118 a first post-conversation representation PCR_1 may comprise determining a first primary speaker representation SR_1_1 based on the first primary speaker metric data. Determining S118 a first post-conversation representation PCR_1 may comprise including the first primary speaker representation SR_1_1 in the first post-conversation representation PCR_1.

Determining S118 a first post-conversation representation PCR_1 may comprise determining a first secondary speaker representation SR_1_2 based on the first speaker metric data SPMD_1. Determining S118 a first post-conversation representation PCR_1 may comprise including the first secondary speaker representation SR_1_2 in the first post-conversation representation PCR_1.

Determining S118 a first post-conversation representation PCR_1 may comprise determining a first tertiary speaker representation SR_1_3 based on the first speaker metric data SPMD_1. Determining S118 a first post-conversation representation PCR_1 may comprise including the first tertiary speaker representation SR_1_3 in the first post-conversation representation PCR_1.

Determining S118 a first post-conversation representation PCR_1 may comprise determining a first quaternary speaker representation SR_1_4 based on the first speaker metric data SPMD_1. Determining S118 a first post-conversation representation PCR_1 may comprise including the first quaternary speaker representation SR_1_4 in the first post-conversation representation PCR_1.

Determining S118 a first post-conversation representation PCR_1 may comprise determining a second primary speaker representation SR_2_1 based on the second speaker metric data SPMD_1. Determining S118 a first post-conversation representation PCR_1 may comprise including the second primary speaker representation SR_2_1 in the first post-conversation representation PCR_1.

Outputting S120 the first post-conversation representation PCR_1, may e.g. comprise outputting a first primary speaker representation, a first secondary speaker representation, a first tertiary speaker representation, a first quaternary speaker representation, and/or a second primary speaker representation.

In one or more exemplary methods, the method 100 comprises in accordance with detecting S116 the termination of the first conversation, determining S122 first conversation data CD_1 based on the first conversation metric data CMD_1 and the second conversation metric data CMD_2.

In one or more exemplary methods, the method 100 comprises transmitting S124 the first conversation data CD_1 to the server device.

Figure 3:
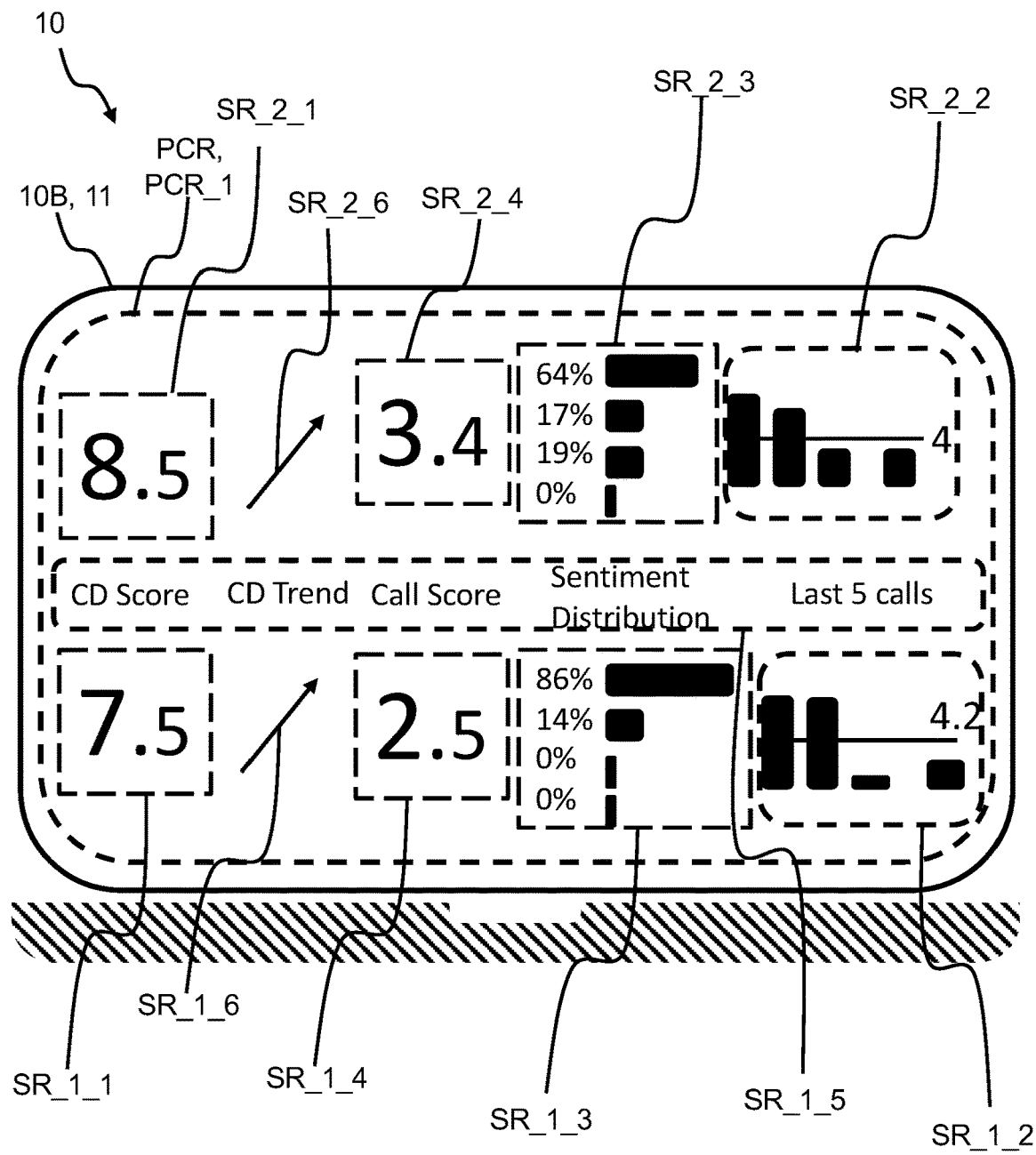

FIG. 3 schematically illustrates an exemplary electronic device, such as electronic device 10, according to the present disclosure. The electronic device 10 is in this example a laptop computer. The electronic device 10 may for example be an electronic device used by a user (e.g. a second speaker), such as an agent of call center or support call center. The electronic device 10 is configured to display on an interface 10B of the electronic device, e.g. on a display 11 of the laptop computer, a user interface comprising a post-conversation representation PCR, e.g. based on the first performance metric. The user interface comprises a plurality of user interface objects. The electronic device 10 displays a first post-conversation representation PCR_1 as a first user interface object PCR_1, e.g. having a first display region. The user of the electronic device 10, e.g. being the second speaker may visualize the post-conversation representation PCR_1 on his/her electronic device 10 after the first conversation. The post-conversation representation PCR_1 may provide feedback and post-conversation evaluation to the user, e.g. second speaker/agent, about the first conversation, the last conversation, and/or historic conversations of the second speaker and/or the first speaker (being a caller or a customer). The first post-conversation representation PCR_1 may comprise a first primary speaker representation SR_1_1, e.g. arranged in a first primary display region. The first primary speaker representation SR_1_1 is based on a first audio signal AS_1 of a first conversation. The first primary speaker representation SR_1_1 is based on conversation metric data, e.g. the first conversation metric data, the second conversation metric data, and/or the third conversation metric data, such as based on the first performance metric PM_1. The first primary speaker representation SR_1_1 may be based on the first primary speaker metric data SPMD_1_1, the first secondary speaker metric data SPMD_1_2, and/or the first tertiary speaker metric data SPMD_1_3. The first primary speaker representation SR_1_1 may be based on sentiment metric data and/or tone metric data, such as a determined first primary sentiment metric SM_1_1 and/or a determined first primary tone metric TM_1_1.

The first primary speaker representation SR_1_1 is indicative of a conversation development score, also denoted CD score, such as call score, of the first speaker, e.g. during the first conversation. The first primary speaker representation SR_1_1 comprises a representation of a conversation development score, e.g. a final conversation development score (such as overall conversation development score), of the first speaker, e.g. during the first conversation. In one or more exemplary embodiments, the first primary speaker representation SR_1_1 the conversation development score may be based on a first conversation score of a first conversation period, e.g. based on the first conversation metric data, such as the first conversation metric, and a second conversation score of a second conversation period, e.g. based on the second conversation metric data, such as the second conversation metric.

The conversation development score may be a score between 0 and 20, 0 and 10, or 0 and 5. The conversation development score may comprise one, two, or three digits after the decimal point. In FIG. 3 the conversation development score displayed in the first primary speaker representation SR_1_1 comprises one digit after the decimal point. The first primary speaker representation SR_1_1 comprises a numeric representation of the conversation development score or call score, where the displayed conversation development score has the number 7.5 out of 10. The first primary speaker representation SR_1_1 may comprise a representation (not shown) indicating that the conversation development score, e.g. of the first conversation, e.g. the last conversation, has been the best conversation development score of the day, the best conversation development score of the week, the best conversation development score of the month, and/or the best conversation development score of the year for the first speaker. In other words, the first primary speaker representation SR_1_1 may comprise a representation indicating that the first conversation has been the conversation where the first speaker have had the best performance, e.g. the best conversation development score, within a certain period. The first primary speaker representation SR_1_1 may comprise a first primary colour based on the conversation metric data. For example, when the conversation development score is in a first range, a first colour may be assigned to the first primary speaker representation SR_1_1. The conversation development score may alternatively or additionally be represented with an arrow, a spark line, and/or a stock ticker. For example, an arrow pointing upwards may indicate a positive conversation development score, e.g. indicating that the conversation development score has improved over the first conversation, such as from the first conversation period to the second conversation period. In other words, the conversation development score may indicate to the user of the electronic device, whether the score or situation of the first speaker during the first conversation has improved or not, e.g. with regard to the conversation metric, speaker metric, and/or performance metric that the conversation development score is based on.

The first primary speaker representation SR_1_1 may comprise a first primary size based on the conversation metric data. For example, when the conversation development score is in a first range, a first size may be assigned to the first primary speaker representation SR_1_1. The first primary speaker representation SR_1_1 may comprise a first primary height based on the conversation metric data. For example, when the conversation development score is in a first range, a first height may be assigned to the first primary speaker representation SR_1_1. In FIG. 3, the digit before the decimal point, e.g. "7" in SR_1_1, has a size larger than the size of the digit after the decimal point, e.g. "5" in SR_1_1.

The first primary speaker representation SR_1_1 may comprise a first primary animation (not shown) based on the conversation metric data. For example, when the conversation development score is the best of the day, a first animation may be assigned to the first primary speaker representation SR_1_1.

The first primary speaker representation SR_1_1 may be based on the first audio signal and the second audio signal. The first post-conversation representation may comprise a second primary speaker representation SR_2_1 for the second speaker. The second primary speaker representation is optionally based on the second audio signal for the second speaker and may be a primary speaker representation, e.g. as described in relation to the first primary speaker representation. In other words, the description of the first primary speaker representation may also apply to the second primary speaker representation. The second primary speaker representation SR_2_1 is indicative of a conversation development score, also denoted CD score, such as call score, of the second speaker, e.g. during the first conversation. In one or more exemplary embodiments, the first post-conversation representation PCR_1 comprises a first primary speaker representation SR_1_1 indicative of a conversation development score of the first speaker and the second speaker, e.g. during the first conversation. In other words, the first post-conversation representation PCR_1 comprises a first primary speaker representation SR_1_1 indicative of a common conversation development score indicative of an evaluation of the development of first conversation.

The first post-conversation representation PCR_1 may comprise a first secondary speaker representation SR_1_2, e.g. arranged in a first secondary display region. The electronic device 10 displays the first secondary speaker representation SR_1_2 as a first secondary user interface object SR_1_2, e.g. having a first secondary display region.

The first secondary speaker representation SR_1_2 is based on historic conversation metric data, such as historic first conversation metric data, historic second conversation metric data, and/or historic first performance metric(s). The first secondary speaker representation SR_1_2 may be based on first speaker metric data SPMD_1, e.g. based on historic first primary speaker metric data SPMD_1_1, historic first secondary speaker metric data SPMD_1_2, and/or historic first tertiary speaker metric data SPMD_1_3. The first secondary speaker representation SR_1_2 comprises a representation of historic conversations, such as historic calls. In other words, the first secondary speaker representation SR_1_2 comprises a representation of the last five conversations, e.g. before the first conversation or including the first conversation being the last conversation. The first secondary speaker representation SR_1_2 comprises a representation of the last five conversations of the first speaker, such as the "last five calls" of the first speaker. In FIG. 3, the first secondary speaker representation SR_1_2 comprises representations in the form of bars, where each bar is indicative of a call score and/or a conversation development score of a call/conversation of the first speaker. The first secondary speaker representation SR_1_2 comprises a baseline, e.g. being indicative of a mean value of the last five call scores. The baseline has a baseline value associated with the horizontal level of the baseline being indicative of the mean call score and/or a mean conversation development score based on the last five calls/conversations. The baseline value has a value of 4.2, indicating that the mean call score and/or mean conversation development score determined based on the last five calls of the first speaker has been determined to be 4.2. The first bar (when starting from the left side of SR_1_2) indicates that the call associated with the first bar has a call score being above the base line, i.e. having a call score being above 4.2. The second bar indicates that the call associated with the second bar has a call score being above the base line, i.e. having a call score being above 4.2. The third bar indicates that the call associated with the third bar has a call score being below the base line, i.e. having a call score being below 4.2. The fourth bar indicates that the call associated with the fourth bar has a call score being below the base line, i.e. having a call score being below 4.2. The fourth bar is not displayed, which indicates that the call associated with the fourth bar has a call score of 0. The fifth bar indicates that the call associated with the fifth bar has a call score being below the base line, i.e. having a call score being below 4.2. The fifth bar represents a bar representation of the call score displayed in the first quaternary speaker representation SR_1_4, the call score being 2.5.

Optionally (not shown in FIG. 3), the first secondary speaker representation SR_1_2 may comprise a representation indicating that the first conversation, e.g. the last conversation, has been the best conversation of the day, the best conversation of the week, the best conversation of the month, and/or the best conversation of the year for the first speaker (e.g. a caller and/or agent). In other words, the first secondary speaker representation SR_1_2 may comprise a representation indicating that the first conversation has been the conversation where the first speaker (e.g. caller and/or agent) have had the best performance, e.g. the best conversation score and/or the best conversation development score, within a certain period.

For example, when the last conversation has been the best of the day/week/month, the electronic device 10 may then display the first secondary speaker representation SR_1_2 as an animated first secondary user interface object SR_1_2, e.g. comprising fireworks animations, party animations, and/or popping bottle animation. The first secondary speaker representation SR_1_2 may also comprise a text indicating e.g. to the first speaker that the last conversation was the best conversation with the second speaker, e.g. that specific second speaker.

The first post-conversation representation PCR_1 may comprise a second secondary speaker representation SR_2_2, e.g. arranged in a second secondary display region. The electronic device 10 displays the second secondary speaker representation SR_2_2 as a second secondary user interface object SR_2_2, e.g. having a second secondary display region.

The second secondary speaker representation SR_2_2 is based on historic conversation metric data, such as historic first conversation metric data, historic second conversation metric data, and/or historic first performance metric(s). The second secondary speaker representation SR_2_2 may be based on second speaker metric data SPMD_2, e.g. based on historic second primary speaker metric data SPMD_2_1, historic second secondary speaker metric data SPMD_2_2, and/or historic second tertiary speaker metric data SPMD_2_3. The second secondary speaker representation SR_2_2 comprises a representation of historic conversations, such as historic calls. In other words, the second secondary speaker representation SR_2_2 comprises a representation of the last five conversations, e.g. before the first conversation or including the first conversation being the last conversation. The second secondary speaker representation SR_2_2 comprises a representation of the last five conversations of the second speaker, such as the "last five calls" of the second speaker. In FIG. 3, the second secondary speaker representation SR_2_2 comprises representations in the form of bars, where each bar is indicative of a call score and/or a conversation development score of a call/conversation of the second speaker. The second secondary speaker representation SR_2_2 comprises a baseline, e.g. being indicative of a mean value of the last five call scores. The baseline has a baseline value associated with the horizontal level of the baseline being indicative of the mean call score and/or a mean conversation development score based on the last five calls/conversation. The baseline value has a value of 4, indicating that the mean call score and/or a mean conversation development score determined based on the last five calls/conversations of the second speaker has been determined to be 4. The first bar (when starting from the left side of SR_2_2) indicates that the call associated with the first bar has a call score being above the baseline, i.e. having a call score being above 4. The second bar indicates that the call associated with the second bar has a call score being above the base line, i.e. having a call score being above 4. The third bar indicates that the call associated with the third bar has a call score being below the base line, i.e. having a call score being below 4. The fourth bar indicates that the call associated with the fourth bar has a call score being below the base line, i.e. having a call score being below 4. The fourth bar is not displayed, which indicates that the call associated with the fourth bar has a call score of 0. The fifth bar indicates that the call associated with the fifth bar has a call score being below the base line, i.e. having a call score being below 4. The fifth bar represents a bar representation of the call score displayed in the second quaternary speaker representation SR_2_4, the call score being 3.4.

Optionally (not shown in FIG. 3), the second secondary speaker representation SR_2_2 may comprise a representation indicating that the first conversation, e.g. the last conversation, has been the best conversation of the day, the best conversation of the week, the best conversation of the month, and/or the best conversation of the year for the second speaker (e.g. a caller and/or agent). In other words, the second secondary speaker representation SR_2_2 may comprise a representation indicating that the first conversation has been the conversation where the second speaker (e.g. caller and/or agent) have had the best performance, e.g. the best conversation score and/or the best conversation development score, within a certain period.

For example, when the last conversation has been the best of the day/week/month, the electronic device 10 may then display the second secondary speaker representation SR_2_2 as an animated second secondary user interface object SR_2_2, e.g. comprising fireworks animations, party animations, and/or popping bottle animation. The second secondary speaker representation SR_2_2 may also comprise a text indicating e.g. to the second speaker (e.g. being an agent) that the last conversation was the best conversation of the day/week/month for the second speaker. The second secondary speaker representation SR_2_2 may also comprise a text indicating e.g. to the second speaker (e.g. being an agent) that the last conversation was the best conversation with the first speaker/caller, e.g. that specific first speaker/caller.

The first post-conversation representation PCR_1 may comprise a first tertiary speaker representation SR_1_3, e.g. arranged in a first tertiary display region. The electronic device 10 displays the first tertiary speaker representation SR_1_3 as a first tertiary user interface object SR_1_3, e.g. having a first tertiary display region.

The first tertiary speaker representation SR_1_3 is based on conversation metric data, e.g. the first conversation metric data, the second conversation metric data, and/or the third conversation metric data, such as based on the first performance metric PM_1. The first tertiary speaker representation SR_1_3 may be based on the first speaker metric data SPMD_1. The first tertiary speaker representation SR_1_3 may be based on the first primary speaker metric data SPMD_1_1, e.g. being sentiment metric data SMD and/or tone metric data TMD, based on the first secondary speaker metric data SPMD_1_2, e.g. being sentiment metric data SMD and/or tone metric data TMD, and/or based on the first tertiary speaker metric data SPMD_1_3, e.g. being sentiment metric data SMD and/or tone metric data TMD.

The first tertiary speaker representation SR_1_3 may be based on sentiment metric data and/or tone metric data, such as a determined first primary sentiment metric SM_1_1 and/or a determined first primary tone metric TM_1_1, of a first speaker.

The first tertiary speaker representation SR_1_3 is indicative of a sentiment distribution of the first speaker during the first conversation, the first conversation period, the second conversation period, and/or the third conversation period.

The first tertiary speaker representation SR_1_3 comprises a representation of a sentiment distribution of the first speaker, e.g. during the first conversation, the first conversation period, the second conversation period, and/or the third conversation period. The first tertiary speaker representation SR_1_3 may comprise a representation of a sentiment distribution of one or more first sentiment type identifiers ST_ID_1_i of the first speaker, e.g. one or more first speaker states.

In other words, the first tertiary speaker representation SR_1_3 may comprise a representation indicative of a time duration of the first conversation, the first conversation period, the second conversation period, the third conversation period, and/or a time duration of the first speaker speaking during the first conversation, during which the first speaker have had one or more first sentiment type identifiers ST_ID_1_i. In FIG. 3, the first tertiary speaker representation SR_1_3 comprises representations in the form of bars of the sentiment distribution of the first speaker during the first conversation, the first conversation period, the second conversation period, and/or the third conversation period.

Each bar is indicative of a distribution or level of a first sentiment type identifier of the first speaker, e.g. a first speaker state of the first speaker.

A sentiment distribution may for example be, during 86% of the first conversation, the first conversation period, the second conversation period, and/or the third conversation period duration the first speaker have had the first speaker state "very negative". The first bar associated with the first speaker state "very negative" has therefore a size corresponding to the value 86%. During 14% of the first conversation, the first conversation period, the second conversation period, and/or the third conversation period duration the first speaker have had the first speaker state "negative". The second bar associated with the first speaker state "negative" has therefore a size corresponding to the value 14%. During 0% of the first conversation, the first conversation period, the second conversation period, and/or the third conversation period duration the first speaker have had the first speaker state "neutral". The third bar associated with the first speaker state "neutral" has therefore a size corresponding to the value 0%, i.e. the bar being almost non-existent. During 0% of the first conversation, the first conversation period, the second conversation period, and/or the third conversation period duration the first speaker have had the first speaker state "positive". The fourth bar associated with the first speaker state "positive" has therefore a size corresponding to the value 0%, i.e. the bar being almost non-existent.

The first tertiary speaker representation may be based on the first audio signal and the second audio signal. The first tertiary speaker representation may be determined as a comparison between the first audio signal and the second audio signal. The first post-conversation representation may comprise a second tertiary speaker representation SR_2_3 for the second speaker. The second tertiary speaker representation is optionally based on the second audio signal for the second speaker and may be a tertiary speaker representation, e.g. as described in relation to the first tertiary speaker representation. In other words, the description of the first tertiary speaker representation may also apply to the second tertiary speaker representation.

The first post-conversation representation PCR_1 comprises a first quaternary speaker representation SR_1_4, e.g. arranged in a first quaternary display region. The electronic device 10 displays the first quaternary speaker representation SR_1_4 as a first quaternary user interface object SR_1_4, e.g. having a first quaternary display region.

The first quaternary speaker representation SR_1_4 is based on conversation metric data, e.g. the first conversation metric data, the second conversation metric data, and/or the third conversation metric data, such as based on the first performance metric PM_1. The first quaternary speaker representation SR_1_4 may be based on the first speaker metric data SPMD_1. The first quaternary speaker representation SR_1_4 may be based on the first primary speaker metric data SPMD_1_1, e.g. being sentiment metric data SMD and/or tone metric data TMD, based on the first secondary speaker metric data SPMD_1_2, e.g. being sentiment metric data SMD and/or tone metric data TMD, and/or based on the first quaternary speaker metric data SPMD_1_3, e.g. being sentiment metric data SMD and/or tone metric data TMD.

The first quaternary speaker representation SR_1_4 may be based on sentiment metric data and/or tone metric data, such as a determined first primary sentiment metric SM_1_1 and/or a determined first primary tone metric TM_1_1 of a first speaker.

The first quaternary speaker representation SR_1_4 is indicative of a conversation score, such as call score, of the first speaker, e.g. during the first conversation. The first quaternary speaker representation SR_1_4 comprises a representation of a conversation score, e.g. a mean conversation score, of the first speaker, e.g. during the first conversation. The conversation score may be a score between 0 and 20, 0 and 10, or 0 and 5. The conversation score may comprise one, two, or three digits after the decimal point. In FIG. 3 the conversation score displayed in the first quaternary speaker representation SR_1_4 comprises one digit after the decimal point. The first quaternary speaker representation SR_1_4 comprises a numeric representation of the conversation score or call score, where the displayed conversation score has the number 2.5 out of 10. The first quaternary speaker representation SR_1_4 may comprise a representation (not shown) indicating that the conversation score, e.g. of the first conversation, e.g. the last conversation, has been the best conversation score of the day, the best conversation score of the week, the best conversation score of the month, and/or the best conversation score of the year for the first speaker. In other words, the first quaternary speaker representation SR_1_4 may comprise a representation indicating that the first conversation has been the conversation where the first speaker have had the best performance, e.g. the best conversation score, within a certain period. The first quaternary speaker representation SR_1_4 may comprise a first quaternary colour based on the one or more speaker metric data. For example, when the conversation score is in a first range, a first colour may be assigned to the first quaternary speaker representation SR_1_4.

The first quaternary speaker representation SR_1_4 may comprise a first quaternary size based on the one or more speaker metric data. For example, when the conversation score is in a first range, a first size may be assigned to the first quaternary speaker representation SR_1_4. The first quaternary speaker representation SR_1_4 may comprise a first quaternary height based on the one or more speaker metric data. For example, when the conversation score is in a first range, a first height may be assigned to the first quaternary speaker representation SR_1_4. In FIG. 3, the digit before the decimal point, e.g. "2" in SR_1_4, has a size larger than the size of the digit after the decimal point, e.g. 5 in SR_1_4.

The first quaternary speaker representation SR_1_4 may comprise a first quaternary animation (not shown) based on the one or more speaker metric data. For example, when the conversation score is the best of the day, a first animation may be assigned to the first quaternary speaker representation SR_1_4.

The first quaternary speaker representation SR_1_4 may be based on the first audio signal and the second audio signal. The first post-conversation representation may comprise a second quaternary speaker representation SR_2_4 for the second speaker. The second quaternary speaker representation is optionally based on the second audio signal for the second speaker and may be a quaternary speaker representation, e.g. as described in relation to the first quaternary speaker representation. In other words, the description of the first quaternary speaker representation may also apply to the second quaternary speaker representation.

The first post-conversation representation PCR_1 may comprise a first senary speaker representation SR_1_6, e.g. arranged in a first senary display region. The first senary speaker representation SR_1_6 is based on a first audio signal AS_1 of a first conversation. The first senary speaker representation SR_1_6 is based on conversation metric data, e.g. the first conversation metric data, the second conversation metric data, and/or the third conversation metric data, such as based on the first performance metric PM_1. The first senary speaker representation SR_1_6 may be based on the first primary speaker metric data SPMD_1_1, the first secondary speaker metric data SPMD_1_2, and/or the first tertiary speaker metric data SPMD_1_3. The first senary speaker representation SR_1_6 may be based on sentiment metric data and/or tone metric data, such as a determined first primary sentiment metric SM_1_1 and/or a determined first primary tone metric TM_1_1.

The first senary speaker representation SR_1_6 is indicative of a conversation development trend, also denoted CD trend, such as call trend, of the first speaker, e.g. during the first conversation. The first senary speaker representation SR_1_1 comprises a representation of a conversation development trend, e.g. a final conversation development trend (such as overall conversation development trend), of the first speaker, e.g. during the first conversation. The conversation development trend may be indicative of the evolution of a conversation metric, speaker metric, and/or performance metric over the first conversation. In FIG. 3, the conversation development trend is represented with an arrow. The arrow is pointing upwards and indicates therefore that a conversation metric, speaker metric, and/or performance metric has improved over the first conversation, e.g. has developed from negative to less negative or positive during the first conversation. In other words, the conversation development trend may indicate to the user of the electronic device, whether the situation of the first speaker during the first conversation has improved or not, e.g. with regard to the conversation metric, speaker metric, and/or performance metric that the conversation development trend is based on. In one or more exemplary embodiments, the first senary speaker representation SR_1_6 the conversation development trend may be based on a first conversation score of a first conversation period, e.g. based on the first conversation metric data, such as the first conversation metric, and a second conversation score of a second conversation period, e.g. based on the second conversation metric data, such as the second conversation metric. When the conversation development trend indicates an arrow pointing upwards, it may indicate that the first speaker has been turned. The arrow may also be denoted a sparkline. The arrow or sparkline may be indicative of a trend of a conversation, such as the first conversation. The arrow or sparkline may comprise a length, a colour, a thickness, a start number, an end number, and/or a direction code. For example, the arrow or sparkline may comprise a red colour and have a down going direction to indicate a negative development of a conversation. In another example, the arrow or sparkline may be thicker in order to emphasize the conversation development trend, e.g. when an important change in conversation metric, speaker metric, and/or performance metric has happened over the first conversation.

The first senary speaker representation SR_1_6 may comprise a first senary animation (not shown) based on the conversation metric data. For example, when the conversation development trend is indicative of a positive trend (e.g. improvement), a first animation may be assigned to the first senary speaker representation SR_1_6.

The first senary speaker representation SR_1_6 may be based on the first audio signal and the second audio signal. The first post-conversation representation may comprise a second senary speaker representation SR_2_6 for the second speaker. The second senary speaker representation is optionally based on the second audio signal for the second speaker and may be a senary speaker representation, e.g. as described in relation to the first senary speaker representation. In other words, the description of the first senary speaker representation may also apply to the second senary speaker representation. The second senary speaker representation SR_2_6 is indicative of a conversation development trend, also denoted CD trend, such as call trend, of the second speaker, e.g. during the first conversation. In one or more exemplary embodiments, the first post-conversation representation PCR_1 comprises a first senary speaker representation SR_1_6 indicative of a conversation development trend of the first speaker and the second speaker, e.g. during the first conversation. In other words, the first post-conversation representation PCR_1 comprises a first senary speaker representation SR_1_6 indicative of a common conversation development trend indicative of an evaluation of the development of first conversation.

The first post-conversation representation PCR_1 may comprise a first quinary speaker representation SR_1_5, e.g. arranged in a first quinary display region. The electronic device 10 displays the first quinary speaker representation SR_1_5 as a first quinary user interface object SR_1_5, e.g. having a first quinary display region. In FIG. 3, the first quinary speaker representation SR_1_5 is a common speaker representation indicative of one or more labels for the first speaker representations and the second speaker representations. The first quinary speaker representation SR_1_5 may provide indications to the user of the electronic device 10 about which representations that are displayed on the display 11. The first quinary speaker representation SR_1_5 comprises a first label for the first primary speaker representation SR_1_1 and the second primary speaker representation SR_2_1 being "conversation development score". The first quinary speaker representation SR_1_5 comprises a second label for the first senary speaker representation SR_1_6 and the second senary speaker representation SR_2_6 being "conversation development trend". The first quinary speaker representation SR_1_5 comprises a third label for the first quaternary speaker representation SR_1_4 and the second quaternary speaker representation SR_2_4 being "Call Score". The first quinary speaker representation SR_1_5 comprises a fourth label for the first tertiary speaker representation SR_1_3 and the second tertiary speaker representation SR_2_3 being "Sentiment Distribution". The first quinary speaker representation SR_1_5 comprises a fifth label for the first secondary speaker representation SR_1_2 and the second secondary speaker representation SR_2_2 being "Last 5 calls".

Figure 4:
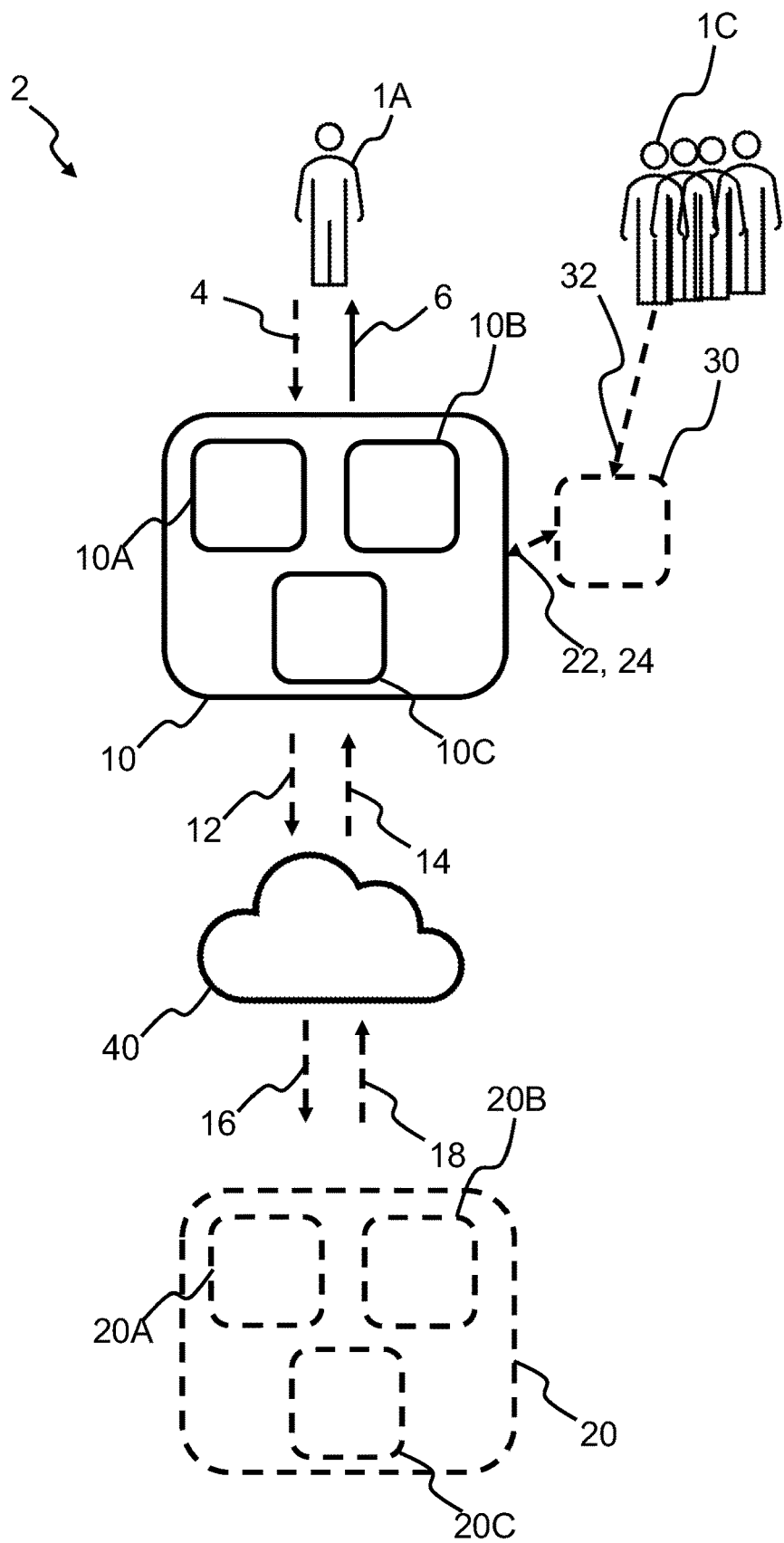

FIG. 4 schematically illustrates an exemplary system, such as system 2, with post-conversation evaluation according to the present disclosure. The system 2 is similar to the system shown in FIG. 1, but where the user 1A and a speaker or group of speakers 1C are collocated, e.g. in the same room or the same place. The user 1A and speaker(s) 1C may conduct a meeting, e.g. a conference, a physical meeting or a job interview. The electronic device 10, such as the interface 10B, may comprise or be connected to a microphone via which the user 1A and/or the speaker(s) 1C may speak into to provide an audio input 32.

Optionally, a speaker electronic device 30 may comprise a microphone that the speaker(s) 1C may speak into to provide an audio input 32. The speaker electronic device 30 may be connected locally to the electronic device 10, e.g. via the interface 10B. The connection may be a wire connection or a wireless connection, such as Bluetooth or the like. The speaker electronic device 30 may transmit 22 one or more audio signals, including the first audio signal, to the electronic device 10 via the connection, e.g. the interface 10B. The speaker electronic device 30 may obtain/receive 24 one or more audio signals from the electronic device 10 via the connection.

Figure 5:
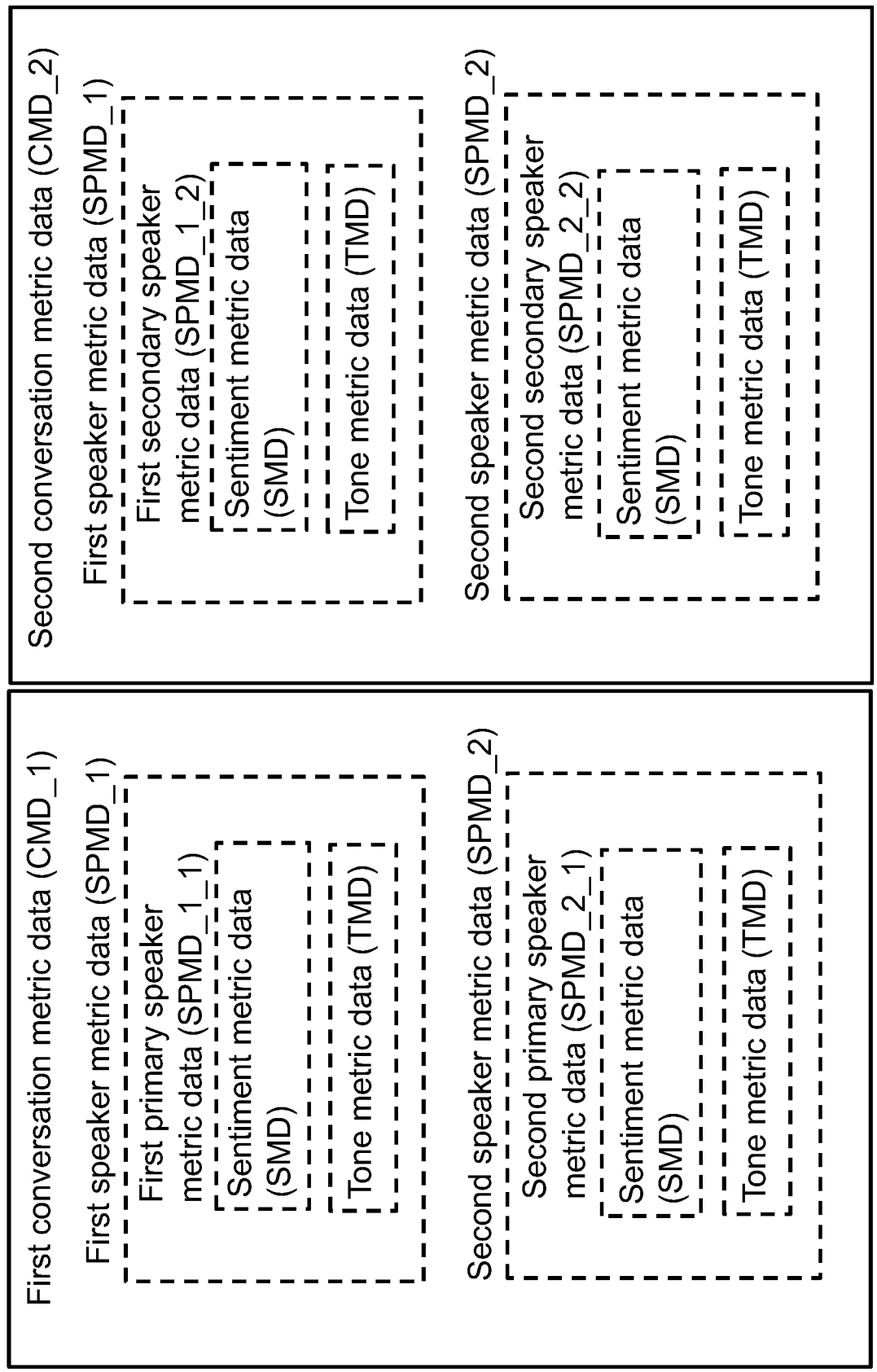

FIG. 5. schematically illustrates an exemplary data structure according to the present disclosure. The first conversation metric data CMD_1 optionally comprises first speaker metric data SPMD_1. The first speaker metric data SPMD_1 optionally comprises first primary speaker metric data SPMD_1_1. The first primary speaker metric data SPMD_1_1 optionally comprises sentiment metric data SMD and/or tone metric data TMD of a first speaker during the first conversation period.

The second conversation metric data CMD_2 optionally comprises first speaker metric data SPMD_1. The first speaker metric data SPMD_1 optionally comprises first secondary speaker metric data SPMD_1_2. The first secondary speaker metric data SPMD_1_2 optionally comprises sentiment metric data SMD and/or tone metric data TMD of a first speaker during the second conversation period. The first speaker metric data SPMD_1 optionally comprises first tertiary speaker metric data SPMD_1_3. The first tertiary speaker metric data SPMD_1_3 optionally comprises sentiment metric data SMD and/or tone metric data TMD of a first speaker during the third conversation period.

The first conversation metric data CMD_1 optionally comprises second speaker metric data SPMD_2. The second speaker metric data SPMD_2 optionally comprises second primary speaker metric data SPMD_2_1. The second primary speaker metric data SPMD_2_1 optionally comprises sentiment metric data SMD and/or tone metric data TMD of a second speaker during the first conversation period.

The second conversation metric data CMD_2 optionally comprises second speaker metric data SPMD_2. The second speaker metric data SPMD_2 optionally comprises second secondary speaker metric data SPMD_2_2. The second secondary speaker metric data SPMD_2_2 optionally comprises sentiment metric data SMD and/or tone metric data TMD of a second speaker during the second conversation period. The second speaker metric data SPMD_2 optionally comprises second tertiary speaker metric data SPMD_2_3. The second tertiary speaker metric data SPMD_2_3 optionally comprises sentiment metric data SMD and/or tone metric data TMD of a second speaker during the third conversation period.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering.

Memory may be one or more of a buffer, a flash memory, a hard drive, a removable media, a volatile memory, a non-volatile memory, a random access memory (RAM), or other suitable device. In a typical arrangement, memory may include a non-volatile memory for long term data storage and a volatile memory that functions as system memory for the processor. Memory may exchange data with processor over a data bus. Memory may be considered a non-transitory computer readable medium.

Memory may be configured to store information (such as information indicative of the one or more audio signals, conversation metric data, the one or more conversation metrics, the first performance metric(s), the one or more sentiment metrics, the speaker representations, the sentiment metric data, and/or the tone metric data) in a part of the memory.

Furthermore, the labelling of a first element does not imply the presence of a second element and vice versa.

It may be appreciated that FIGS. 1-5 comprise some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, and systems described herein are described in the general context of method steps processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly, to be regarded in an illustrative rather than restrictive sense. The claimed invention is intended to cover all alternatives, modifications, and equivalents.

LIST OF REFERENCES 1A user, second speaker
1B speaker, first speaker, caller
1C speaker(s), group of speakers,
2 system
4 user input
6 speaker representation, user output
10 electronic device
10A memory
10B one or more interfaces
10C processor
11 display
12 transmit
14 obtain
16 obtain
18 transmit
20 server device
20A memory
20B interface
20C one or more processors
22 transmit
24 obtain
30 speaker electronic device
32 speaker input, audio input
40 network
AS audio signal
AS_1 first audio signal
AS_2 first audio signal
PCR post-conversation representation
PCR_1 first post-conversation representation
SCS confidence score
SCS_1 first confidence score
SCS_1_1 first primary confidence score
SCS_1_2 first secondary confidence score
SCS_2_1 second primary confidence score
SL sentiment level
SL_1_1 first primary sentiment level
SL_1_2 first secondary sentiment level
SL_2_1 second primary sentiment level
SM sentiment metrics
SM_1 first sentiment metric
SM_1_1 first primary sentiment metric
SM_1_2 first secondary sentiment metric
SM_2 second sentiment metric
SM_2_1 second primary sentiment metric
SM_2_2 second secondary sentiment metric
ST_ID_1_1 first primary sentiment type identifier
ST_ID_1_2 first secondary sentiment type identifier
ST_ID_2_1 second primary sentiment type identifier
ST_ID_2_2 second secondary sentiment type identifier
ST_ID_SET_1 primary set of sentiment type identifiers
ST_ID_SET_2 secondary set of sentiment type identifiers
SMD sentiment metric data
SPMD speaker metric data
SPMD_1 first speaker metric data
SPMD_1_1 first primary speaker metric data
SPMD_1_2 first secondary speaker metric data
SPMD_1_3 first tertiary speaker metric data
SPMD_2 second speaker metric data
SPMD_2_1 second primary speaker metric data
SR speaker representation
SR_1 first speaker representation
SR_1_1 first primary speaker representation
SR_1_2 first secondary speaker representation
SR_1_3 first tertiary speaker representation
SR_1_4 first quaternary speaker representation SR_1_5 first quinary speaker representation
SR_1_6 first senary speaker representation
SR_1_7 first septenary speaker representation
SR_1_8 first octonary speaker representation
SR_2 second speaker representation
SR_2_1 second primary speaker representation
SR_2_2 second secondary speaker representation
SR_2_3 second tertiary speaker representation
SR_2_4 second quaternary speaker representation
SR_2_5 second quinary speaker representation
SR_2_6 second senary speaker representation
SR_2_7 second septenary speaker representation
SR_2_8 second octonary speaker representation
ST_ID sentiment type identifier
ST_ID_1 first sentiment type identifier
ST_ID_1_1 first primary sentiment type identifier
ST_ID_1_2 first secondary sentiment type identifier
ST_ID_SET set of sentiment type identifiers
ST_ID_SET_1 primary set of sentiment type identifiers
ST_ID_SET_2 secondary set of sentiment type identifiers
100 method of operating a system comprising an electronic device
S102 obtaining one or more audio signals
S104 determining a first conversation period
S106 determining first conversation metric data
S106A determining first speaker metric data of a first speaker in the first conversation and/or second speaker metric data of a second speaker in the first conversation
S108 determining a second conversation period of the first conversation
S110 determining second conversation metric data including a second conversation metric based on the second conversation period
S111 determining a third conversation period having a third duration and being associated with a third phase of the first conversation
S112 determining a first performance metric based on a change between the first conversation metric data and the second conversation metric data
S112A determining a change between the first conversation metric data and the second conversation metric
S112B applying a first weighting of the first conversation metric and a second weighting of the second conversation metric, where the second weighting is larger than the first weighting
S114 outputting, via the interface of the electronic device, the first performance metric
S116 detecting a termination of the first conversation
S118 determining a first post-conversation representation based on the first performance metric
S118A determining a first primary speaker representation based on the first conversation metric data and the second conversation metric data
S118B including the first primary speaker representation in the first post-conversation representation
S120 outputting, via the interface of the electronic device, the first post-conversation representation
S122 determining first conversation data based on the first conversation metric data and the second conversation metric data
S124 transmitting the first conversation data to the server device
B reiterate, restart

The invention claimed is:

1. A method of operating a system comprising an electronic device, the electronic device comprising an interface, a processor, and a memory, the method comprising:
   obtaining one or more audio signals including a first audio signal of a first conversation;
   determining a first conversation period of the first conversation, the first conversation period having a first duration, wherein the first duration is determined based on a content of the first conversation, and wherein the first conversation period is associated with an initial phase of the first conversation;
   determining first conversation metric data including a first conversation metric based on the first conversation period;
   determining a second conversation period of the first conversation different from the first conversation period, the second conversation period having a second duration, wherein the second duration is determined based on a content of the first conversation, and wherein the second conversation period is associated with an ending phase of the first conversation;
   determining second conversation metric data including a second conversation metric based on the second conversation period;
   determining a first performance metric based on a change between the first conversation metric data and the second conversation metric data, wherein the first performance metric indicates a quality of performance in the second conversation period relative to the first conversation period; and
   outputting, via the interface of the electronic device, the first performance metric.

2. Method according to claim 1, the method comprising:
   detecting a termination of the first conversation, and in accordance with detecting the termination of the first conversation, determining a first post-conversation representation based on the first performance metric; and
   outputting, via the interface of the electronic device, the first post-conversation representation.

3. Method according to claim 1, wherein determining a first performance metric comprises determining a change between the first conversation metric data and the second conversation metric data.

4. Method according to claim 1, wherein the time period between the first conversation period and the second conversation period is at least 15 s.

5. Method according to claim 1, wherein determining first conversation metric data comprises determining first speaker metric data of a first speaker in the first conversation and/or second speaker metric data of a second speaker in the first conversation.

6. Method according to claim 1, wherein determining second conversation metric data comprises determining first speaker metric data of a first speaker in the first conversation and/or second speaker metric data of a second speaker in the first conversation.

7. Method according to claim 2, wherein determining a first post-conversation representation comprises determining a first primary speaker representation based on the first conversation metric data and the second conversation metric data, and including the first primary speaker representation in the first post-conversation representation.

8. Method according to claim 1, wherein the first conversation metric data and the second conversation metric data each comprises sentiment metric data and/or tone metric data.

9. Method according to claim 1, the method comprising determining a third conversation period having a third duration and being associated with a third phase of the first conversation.

10. Method according to claim 1, wherein determining a first performance metric comprises applying a first weighting of the first conversation metric and a second weighting of the second conversation metric, where the second weighting is larger than the first weighting.

11. Method according to claim 2, wherein the method comprises, in accordance with detecting the termination of the first conversation, determining first conversation data based on the first conversation metric data and the second conversation metric data and transmitting the first conversation data to a server device.

12. Electronic device comprising a processor, a memory, and an interface, wherein the processor is configured to perform a method according to claim 1.

13. Electronic device comprising a processor, a memory, and an interface, wherein the processor is configured to:
- obtain one or more audio signals including a first audio signal during a first conversation;
- determine a first conversation period of the first conversation, the first conversation period having a first duration, wherein the first duration is determined based on a content of the first conversation, and wherein the first conversation period is associated with an initial phase of the first conversation;
- determine first conversation metric data including a first conversation metric based on the first conversation period;
- determine a second conversation period of the first conversation, the second conversation period having a second duration, wherein the second duration is determined based on a content of the first conversation, and wherein the second conversation period is associated with an ending phase of the first conversation;
- determine second conversation metric data including a second conversation metric based on the second conversation period;
- determine a first performance metric based on a change between the first conversation metric data and the second conversation metric data, wherein the first performance metric indicates a quality of performance in the second conversation period relative to the first conversation period; and
- output, via the interface, the first performance metric.

14. System comprising:
a server device; and
an electronic device, wherein the electronic device comprises a processor, a memory, and an interface, wherein the processor is configured to:
- obtain one or more audio signals including a first audio signal during a first conversation;
- determine a first conversation period of the first conversation, the first conversation period having a first duration, wherein the first duration is determined based on a content of the first conversation, and wherein the first conversation period is associated with an initial first phase of the first conversation;
- determine first conversation metric data including a first conversation metric based on the first conversation period;
- determine a second conversation period of the first conversation, the second conversation period having a second duration, wherein the second duration is determined based on a content of the first conversation, and wherein the second conversation period is associated with an ending phase of the first conversation;
- determine second conversation metric data including a second conversation metric based on the second conversation period;
- determine a first performance metric based on a change between the first conversation metric data and the second conversation metric data, wherein the first performance metric indicates a quality of performance in the second conversation period relative to the first conversation period; and
- output, via the interface, the first performance metric.

15. System according to claim 14, wherein the processor is configured to:
- detect a termination of the first conversation, and in accordance with detecting the termination of the first conversation, determine a first post-conversation representation based on the first performance metric; and
- output, via the interface, the first post-conversation representation.

16. System according to claim 14, wherein the time period between the first conversation period and the second conversation period is at least 15 s.

17. System according to claim 14, wherein the first conversation metric data and the second conversation metric data each comprises sentiment metric data and/or tone metric data.

18. System according to claim 15, wherein the processor is configured to, in accordance with detecting the termination of the first conversation, determine first conversation data based on the first conversation metric data and the second conversation metric data and transmit the first conversation data to a server device.

* * * * *